US009160553B2

United States Patent
Wu et al.

(10) Patent No.: US 9,160,553 B2
(45) Date of Patent: Oct. 13, 2015

(54) ADAPTIVE MULTICAST NETWORK COMMUNICATIONS

(71) Applicant: Architecture Technology Corporation, Minneapolis, MN (US)

(72) Inventors: John Wu, Eden Prairie, MN (US); Nathan Bahr, Eden Prairie, MN (US); Maher Kaddoura, Eden Prairie, MN (US); Ranga Ramanujan, Medina, MN (US)

(73) Assignee: Architecture Technology Corporation, Minneapolis, MN (US)

( * ) Notice: Subject to any disclaimer, the term of this patent is extended or adjusted under 35 U.S.C. 154(b) by 0 days.

(21) Appl. No.: 14/216,732

(22) Filed: Mar. 17, 2014

(65) Prior Publication Data

US 2015/0146603 A1 May 28, 2015

Related U.S. Application Data

(60) Provisional application No. 61/909,854, filed on Nov. 27, 2013.

(51) Int. Cl.
*H04L 12/18* (2006.01)
*H04L 29/06* (2006.01)

(52) U.S. Cl.
CPC ............ *H04L 12/189* (2013.01); *H04L 12/185* (2013.01); *H04L 29/06455* (2013.01)

(58) Field of Classification Search
None
See application file for complete search history.

(56) References Cited

U.S. PATENT DOCUMENTS

| | | | |
|---|---|---|---|
| 6,765,892 B1 * | 7/2004 | Leung et al. | 370/332 |
| 6,975,647 B2 | 12/2005 | Neale et al. | |
| 7,310,730 B1 * | 12/2007 | Champagne et al. | 713/163 |
| 7,360,083 B1 | 4/2008 | Ragireddy et al. | |
| 7,441,267 B1 | 10/2008 | Elliott | |
| 7,684,414 B2 | 3/2010 | Durst | |
| 7,964,624 B1 | 6/2011 | Cottrell et al. | |
| 8,311,049 B2 | 11/2012 | Roberts et al. | |
| 8,549,135 B1 | 10/2013 | Yazdani | |

(Continued)

OTHER PUBLICATIONS

Burdin et al., "Techniques for Enabling Dynamic Routing on Airborne Platforms," 2009 IEEE Military Communications Conference, The MITRE Corporation, Case# 09-3230, Oct. 18-21, 2009, 9 pp.

(Continued)

*Primary Examiner* — Robert C Scheibel
(74) *Attorney, Agent, or Firm* — Shumaker & Sieffert, P.A.

(57) ABSTRACT

This disclosure is directed to techniques for communicating in an adaptive multicast network. In general, the disclosure is directed to communicating in an adaptive multicast network. This may be done by archiving, at a rendezvous point, multicast subscription information for terminal nodes in the adaptive multicast network, wherein the multicast subscription information comprises a dynamic list of receiver terminal nodes located within the adaptive multicast network that subscribe to particular multicast streams from one or more terminal nodes in the adaptive multicast network. A router receives a multicast stream from a sender terminal node. The router receives the multicast subscription information for the multicast stream sent by the sender terminal node from the rendezvous point. The router forwards the multicast stream to all receiver terminal nodes in the dynamic list of receiver terminal nodes indicated as subscribing to the multicast stream sent by the sender terminal node.

24 Claims, 21 Drawing Sheets

(56) References Cited

U.S. PATENT DOCUMENTS

| | | | |
|---|---|---|---|
| 2003/0018715 A1* | 1/2003 | O'Neill | 709/204 |
| 2003/0131079 A1 | 7/2003 | Neale et al. | |
| 2009/0238367 A1 | 9/2009 | Pinder | |
| 2013/0318238 A1 | 11/2013 | Hall et al. | |

OTHER PUBLICATIONS

Danilov et al., "Manet Multicast with Multiple Gateways," 2008 IEEE Military Communications Conference, Nov. 16-19, 2008, 8 pp.

Elmasry et al., "Reservation-Based QoS in an Airborne Network," 2009 IEEE Military Communications Conference, Oct. 18-21, 2009, 7 pp.

Estrin et al., Protocol Independent Multicast-Sparse Mode (PIM-SM): Protocol Specification, RFC 2362—The Internet Society, Jun. 1998, 55 pp.

Garcia-Luna-Aceves et al., "The Core-Assisted Mesh Protocol," IEEE Journal on Selected Areas in Communications, vol. 17, No. 8, Aug. 1999, 15 pp.

Jetcheva et al., "Adaptive Demand-Driven Multicast Routing in Multi-Hop Wireless Ad Hoc Networks," MobiHoc '01 Proceedings of the 2nd ACM international symposium on Mobile ad hoc networking & computing, Oct. 4-5, 2001, 12 pp.

Lee et al., "On-Demand Multicast Routing Protocol in Multihop Wireless Mobile Networks," Mobile Networks and Applications, vol. 7, No. 6, Dec. 2002, 16 pp.

Macker et al., "Simplified Multicast Forwarding in Mobile Ad hoc Networks," 2004 IEEE Military Communications Conference, vol. 2, Oct. 31-Nov. 4, 2004, 8 pp.

Moy, "Multicast Extensions to OSPF," RFC 1584, Mar. 1994, 101 pp.

Nakamoto et al., "High Assurance Internet Protocol Encryptor Multicast Discovery Service," MITRE Technical Report MTR110417, Sep. 2011, 14 pp.

Nakamoto et al., "Scalable AIPE Discovery using DNS-like Referral Model," 2005 IEEE Military Communications Conference, vol. 4, Oct. 17-20, 2005, 7 pp.

Rangarajan et al.,"Performance Analysis of Multicast Protocols: ODMRP, PUMA and OBAMP," International Journal of Computer Science and Communication, vol. 2, No. 2, Jul.-Dec. 2011, 5 pp.

Royer et al., "Multicast operation of the ad-hoc on-demand distance vector routing protocol," MobiCom '99 Proceedings of the 5th annual ACM/ICEEE international conference on Mobile computing and networking, Aug. 15-19, 1999, 12 pp.

Vaishampayan et al, "Efficient and Robust Multicast Routing in Mobile Ad Hoc Networks," Proceedings of the 1st IEEE International Conference on Mobile Ad-hoc and Sensor Systems, Oct. 24-27, 2004, 11 pp.

Wang et al, "An Intelligent On-Demand Multicast Routing Protocol in Ad Hoc Networks," 15th International Conference on Information Networking, Jan. 31-Feb. 2, 2001, 6 pp.

Wu et al., "MRIS: A Multicast Protocol for Ad Hoc Wireless Networks," Proceedings of the IEEE Military Communications Conference, vol. 1, Oct. 31-Nov. 3, 1999, 5 pp.

Xie et al., "AMRoute: Ad Hoc Multicast Routing Protocol," Mobile Networks and Applications, vol. 7, No. 6, Dec. 2002, 11 pp.

U.S. Appl. No. 14/165,192 by Deborah K. Charan, filed Jan. 27, 2014.

* cited by examiner

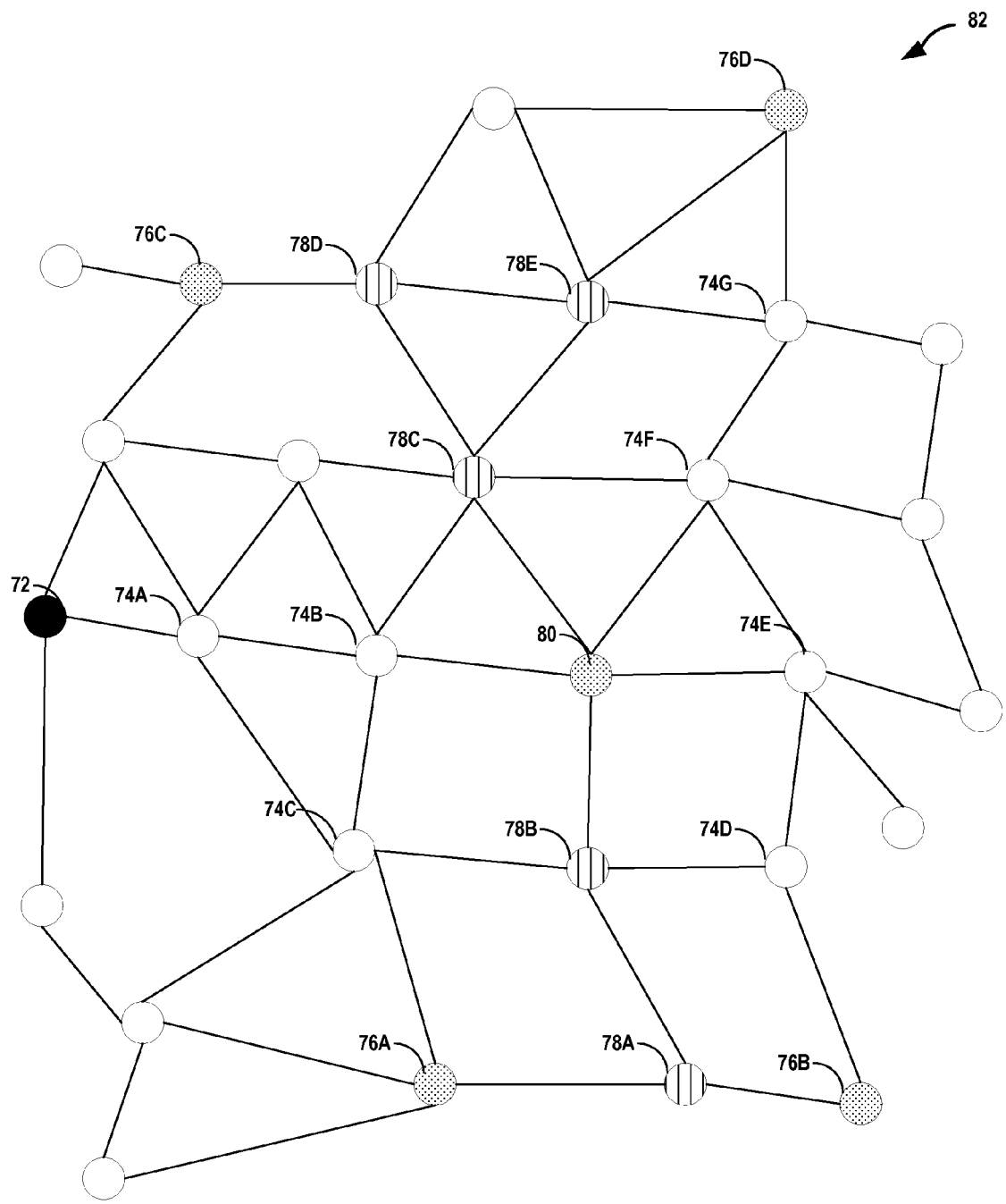
FIG. 7
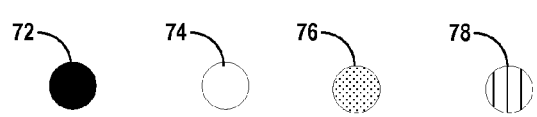

| Bit offset | 0-3 | 4-7 | 8-11 | 12-15 | 16-23 | 24-31 |
|---|---|---|---|---|---|---|
| 0 | Version=6 | Traffic Class | | | Flow Label | |
| 32 | Payload Length | | | | Next Header | Hop Limit = data frames + 2 |
| 64-127 | Source IP Address = Red side PEP IPv6 address | | | | | |
| 128-195 | Destination IP Address = RBMC | | | | | |

| Bit offset | 0-3 | 4-7 | 8-11 | 12-15 | 16-23 | 24-31 |
|---|---|---|---|---|---|---|
| 0 | Version=6 | Traffic Class | | | Flow Label | |
| 32 | Payload Length | | | | Next Header | Hop Limit = 2 |
| 64-127 | Source IP Address = Red side PEP IPv6 address | | | | | |
| 128-195 | Destination IP Address = RBMC | | | | | |

| Bit offset | 0-3 | 4-7 | 8-13 | 14-15 | 16-23 | 24-31 |
|---|---|---|---|---|---|---|
| 0 | Version=4 | Header Len | DSCP | ECN | Total Length | |
| 32 | Identification | | | | Flags | Fragmentation Offset |
| 64 | TTL | | | Protocol | Checksum | |
| 96 | Source IP Address = Red-side PEP IPv4 address | | | | | |
| 128 | Destination IP Address = Variable Address | | | | | |

FIG. 8C

| Bit offset | 0-3 | 4-7 | 8-11 | 12-15 | 16-23 | 24-31 |
|---|---|---|---|---|---|---|
| 0 | Version=6 | Traffic Class | | Flow Label | | |
| 32 | Payload Length | | | | Next Header | TTL/Hop Limit |
| 64-127 | Source IP Address = Red side PEP IPv6 address | | | | | |
| 128-195 | Destination IP Address = RBMC | | | | | |

FIG. 8D

ADAPTIVE MULTICAST NETWORK COMMUNICATIONS

This application claims priority from U.S. Provisional Application Ser. No. 61/909,854, filed Nov. 27, 2013, the entire content of which is incorporated herein by reference.

STATEMENT REGARDING FEDERALLY SPONSORED RESEARCH OR DEVELOPMENT

This invention was made with Government support under Contract FA8750-13-C-0042 with the United States Department of Defense. The Government may have certain rights in this invention.

TECHNICAL FIELD

This disclosure relates to communicating in an adaptive multicast network.

BACKGROUND

A multicast network is, generally, a network where a single sender can send data across a computer network to several users at the same time. Secure and efficient IP multicast improves efficiency of bandwidth utilization in tactical networks such as the Airborne Networks and facilitates dissemination of mission critical information among tactical edge users. Various multicast routing protocols have been proposed to provide multicast support in mobile ad hoc networks (MANETs). The majority of these routing protocols use either a mesh-based delivery structure or a tree-based delivery structure.

In mesh-based (including flooding) protocols, redundant paths are created between terminal nodes to reduce packet loss due to link failures. In networks with high terminal node mobility, this approach provides better delivery ratio of multicast data with less control data needed to maintain the delivery structure.

Tree-based multicast protocols build distribution trees from sender to receivers and generally avoid redundant paths. Protocol-Independent Multicast (PIM) protocols are tree-based protocols that have been used in wired networks to distribute multicast packets working with all underlying unicast routing protocols. In particular, the sparse mode PIM (PIM-SM) builds a shared distribution tree for all the senders originating at a designated router called a rendezvous point (RP). PIM-SM provides a capability to prune the distribution tree, where routers with local receivers can join a source-specific, shortest-path distribution tree. But the pruning process has to be initiated by the RP. PIM-SM works best in environments where group members are distributed across many regions of the network and bandwidth is scarce. Various other multicast protocols have been proposed for tree-based distribution in wireless mobile networks. These approaches have mostly been outperformed by the mesh approaches as their delivery ratios tend to suffer as terminal node mobility increases.

SUMMARY

This disclosure is directed to communicating in an adaptive multicast network. Example techniques of this disclosure may include archiving, at a rendezvous point, multicast subscription information for terminal nodes in the adaptive multicast network, wherein the adaptive multicast network is divided into a plurality of trusted networks, wherein the multicast subscription information comprises a dynamic list of receiver terminal nodes located within the adaptive multicast network that subscribe to particular multicast streams from one or more terminal nodes in the adaptive multicast network, and wherein the rendezvous point is a designated router in a first trusted network. A router may receive a multicast stream from a sender terminal node, wherein the router and the sender terminal node are in a second trusted network. The router may receive the multicast subscription information for the multicast stream sent by the sender terminal node from the rendezvous point. The router may forward the multicast stream to all receiver terminal nodes in the dynamic list of receiver terminal nodes indicated as subscribing to the multicast stream sent by the sender terminal node.

In one example, the disclosure describes a method for communicating in an adaptive multicast network. Example techniques of this disclosure may include archiving, at a rendezvous point, multicast subscription information for terminal nodes in the adaptive multicast network, wherein the adaptive multicast network is divided into a plurality of trusted networks, wherein the multicast subscription information comprises a dynamic list of receiver terminal nodes located within the adaptive multicast network that subscribe to particular multicast streams from one or more terminal nodes in the adaptive multicast network, and wherein the rendezvous point is a designated router in a first trusted network. A router receives a multicast stream from a sender terminal node. The router receives the multicast subscription information for the multicast stream sent by the sender terminal node from the rendezvous point. The router forwards the multicast stream to all receiver terminal nodes in the dynamic list of receiver terminal nodes indicated as subscribing to the multicast stream sent by the sender terminal node.

In another example, the disclosure describes a communication system in an adaptive multicast network. The communication system may contain one or more terminal nodes. The communication system may also contain a rendezvous point, wherein the rendezvous point is a designated router in a trusted network that stores multicast subscription information for the adaptive multicast network is configured to archive the multicast subscription information for the one or more terminal nodes, wherein the multicast subscription information comprises a dynamic list of receiver terminal nodes located within the adaptive multicast network that subscribe to particular multicast streams from one or more terminal nodes in the adaptive multicast network. The communication system may also contain a router, wherein the router is configured to receive a multicast stream from a sender terminal node and to receive the multicast subscription information for the multicast stream sent by the sender terminal node from the rendezvous point, and wherein the router is further configured to forward the multicast stream to all receiver terminal nodes in the dynamic list of receiver terminal nodes indicated as subscribing to the multicast stream sent by the sender terminal node.

In another example, the disclosure is directed to a computer-readable storage medium storing instructions that, when executed, cause one or more processors of a system configured to communicate between terminal nodes in a mobile ad hoc network, wherein the mobile ad hoc network comprises a plurality of terminal nodes, to assign a mobility coefficient to each terminal node in the mobile ad hoc network. The instructions may further designate a core terminal node in the mobile ad hoc network from the plurality of terminal nodes based on the mobility coefficient. The instructions may further set a default routing broadcast protocol. The instructions may further send multicast announcements from one of the terminal nodes in one trusted network to the core terminal node in the case that one or more terminal nodes in the mobile ad hoc network is requesting to receive a multicast stream. The instructions may further change the default routing broadcast protocol to a second routing broadcast protocol based on a concentration of terminal nodes that have requested to receive the multicast stream and based on the mobility coefficients assigned to each of the terminal nodes that have requested to receive the multicast stream.

In another example, the disclosure is directed to a method for internet group management protocol tunneling. In this method, a computing device in a subnet elects a designated router in the subnet. The designated router sends internet group management protocol queries to at least one router in the subnet. Internet group management protocol reports are tunneled to the designated router.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 7 is a block diagram illustrating a near-optimal adaptive multicast tree according to one example of the disclosure.

FIGS. 8A-8D are conceptual diagrams showing the construction and bit locations of various data packets sent via router signaling in an adaptive and integrated multicast for the airborne networks.

DETAILED DESCRIPTION

Figure 1:
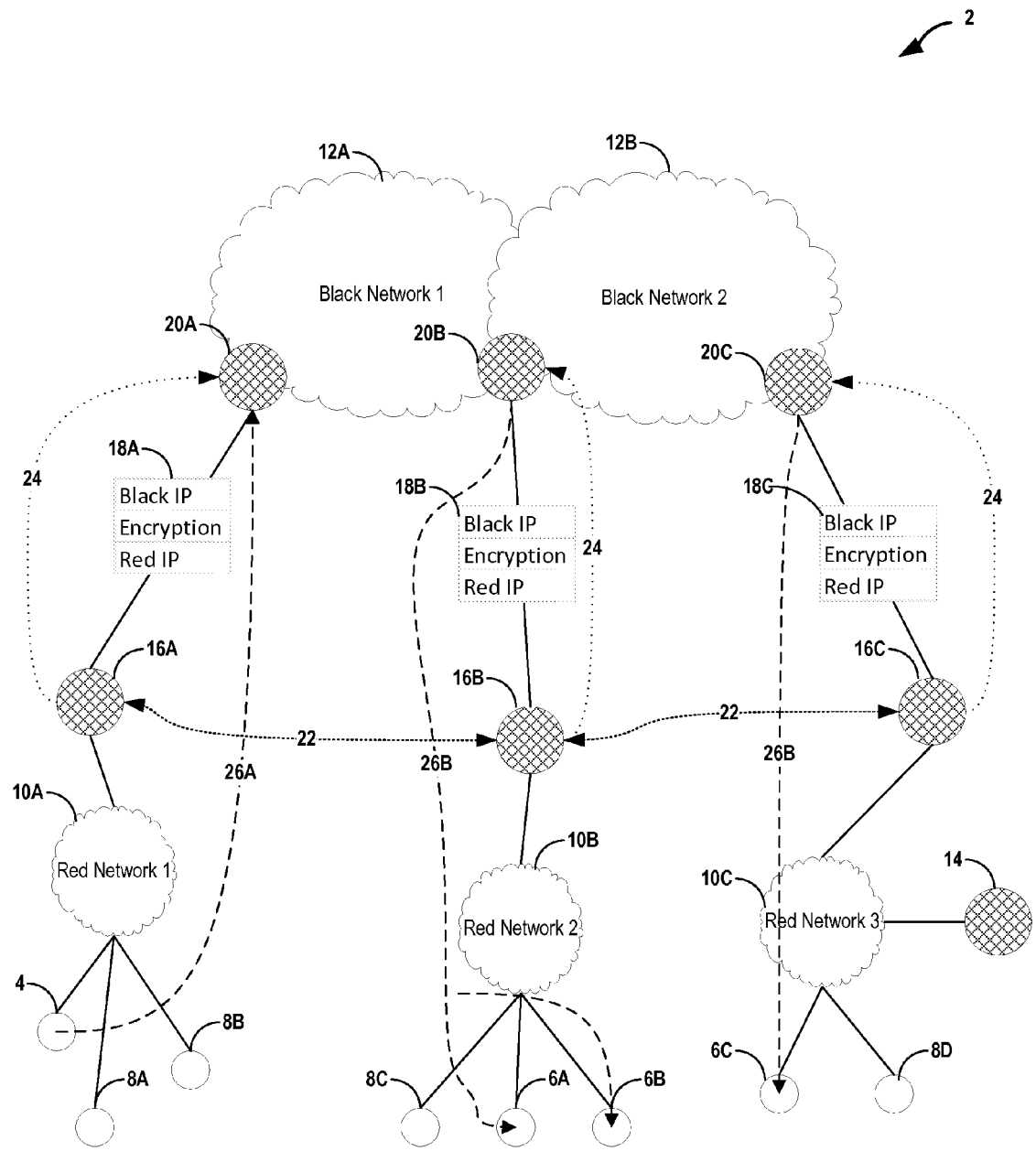
FIG. 1 is a block diagram illustrating an adaptive and integrated multicast network with router signaling.

In addition to the challenges associated with finding the most optimal multicast routing scheme for networks, including airborne networks, multicast in crypto-partitioned networks present other unique challenges. At the edge of the untrusted (black) core of airborne networks, inline network encryptor (INE) devices are deployed to protect the trusted (red) networks. For security reasons, these INE devices typically block multicast signaling packets such as those used in PIM, which prevents any multicast protocols that rely on signaling in addition to or other than internet group management protocol (IGMP) to operate across the red-black boundaries. Furthermore, multicast source addresses in the red networks are hidden from the black side, e.g., source addresses for IGMPv3 source filtering are suppressed by INEs, and the source address in multicast data packets is mapped to the cypher-text (CT) address of the INE. A multicast address on the red side can also be mapped to a different multicast address on the black side by the INE, as INEs can map plain-text (PT) multicast addresses to CT multicast address "one to one" or "many to one". The challenge here is to provide multicast services across the red-black boundaries and seamlessly integrate potentially different multicast routing protocols across these boundaries, especially for source-specific multicast.

Because of the mesh structure in high mobility networks, the performance can actually improve when multicast group size increases, since the redundant paths may become less unnecessary as the need to cover larger number of terminal nodes increases. The main problem with these approaches is the overhead traffic caused by redundant data transmissions, which becomes more serious when multicast group size is small and network traffic load becomes heavy.

In view of these drawbacks, this disclosure presents techniques, methods, and systems for overcoming limitations of the existing IP multicast approaches. The first limitation is the inefficient use of the scarce transmission resources in airborne networks and other networks where the terminal nodes have varying levels of mobility and failure of multicast protocols due to changes in network topology. The second major limitation overcome by the techniques of this disclosure is the lack of uniform support for multicast networking in crypto-partitioned networks. In particular, the techniques of this disclosure minimize the need for labor-intensive manual coordination and configuration of trusted networks (e.g., red networks) protected by Inline Network Encryption (INE) devices such as High Assurance Internet Protocol Encryptors (HAIPEs®). Red networks are networks that can contain one or more terminal nodes that can send messages back and forth where the messages are not encrypted by any outside device. Meanwhile, black networks are networks that receive encrypted data packets as they travel between red networks, as they contain untrusted terminal nodes, routers, and devices.

To overcome the limitations of the existing multicast approaches and achieve the capability for secure and efficient multicast services, the example techniques of this disclosure address the challenges of developing viable multicast protocols that optimize the performance of heterogeneous ad hoc networks with dynamically changing network topology, maximizing the throughput for multicast applications while minimizing bandwidth overhead associated with the protocols, and developing a scalable multicast architecture and implementation that works across red-black boundaries, with INE-compliant multicast signaling, as well as dynamic configuration and membership control of INEs for multicast groups.

This disclosure describes various techniques for implementing these features, including a Dynamic Adaptive Hybrid Multicast Routing (DAHMR), which may be a multicast routing scheme that dynamically adapts to changes in a mobile ad hoc network (MANET) for optimized usage of the network resources, with Multicast Gateways (MGs) interconnecting heterogeneous multicast networks. A MANET may be a self-configuring infrastructureless network of mobile devices connected by wireless signaling. This disclosure also describes an INE-compliant (e.g., HAIPE®-Complaint) Multicast Signaling Protocol (HC-MSP), which may be an INE-compliant multicast integration scheme that enables secure, efficient and seamless multicast across the red-black boundaries. In general, the techniques of this disclosure may be referred to as Adaptive and Integrated Multicast for Airborne Networks (AIM-AN), though it should be understood that techniques of this disclosure may be used in various network scenarios and configurations, and are not limited to airborne networks.

In one example of the AIM-AN approach, adaptive multicast routing may be implemented using a hybrid multicast routing scheme that takes into account real-time characteristics of the multicast environments for the most optimal delivery of multicast data. Using the AIM-AN techniques for HAIPE®-compliant multicast signaling, coupled with inter-HAIPE® coordination, the techniques of this disclosure enable seamless integration of red networks with a black core, and allow end users across the networks to securely participate in multicast communications. The following paragraphs and related figures describe example implementations and techniques of AIM-AN.

FIG. 1 is a block diagram illustrating a network 2 with router signaling that may implement the techniques of this disclosure. While there could be other configurations, an example of a basic structure for network 2 illustrated in FIG. 1. Sender terminal node 4 may be located in trusted Red network 10A. Receiver terminal nodes 6A, 6B, and 6C are located in other trusted Red networks 10B and 10C, though a receiver terminal node could be located in the same Red network as the sender terminal node. Other terminal nodes 8A, 8B, 8C, and 8D are also located in trusted Red networks, though they are not designated to receive multicast stream 26A. Terminal nodes 4, 6A, 6B, 6C, 8A, 8B, and 8C are devices that can either send or receive data from other devices in the overall network. These devices could be stationary computing devices or mobile computing devices.

Each trusted Red network 10 may include a Red-side router 16, an inline encryptor 18, and a Black-side router 20 associated with it. Red-side router 16 may be a part of red network 10, while each black-side router 20 may be a part of black network 12. Any Red-side router 10 can communicate with any other Red-side router 10 via red-to-red signaling 22. A Red-side router 10 can also communicate with its associated Black-side router 20 via red-to-black signaling 24. Red-to-black signaling 24 allows the two routers to communicate through the INE 18 in various ways which will be described throughout this disclosure. These signaling methods could be Crypto-Partitioning Aware PEP for Tactical Networks (CAPTAIN®), among other things.

In one example of the disclosure, Crypto-Partitioning Aware Performance-Enhancing Proxies for Tactical Networks (CAPTAIN®) and the CAPTAIN® signaling protocol (CSP) are proposed. The CAPTAIN® techniques allow devices to communicate across INEs, thus allowing for the implementation of PEP adapters.

Certain IP-based INEs isolate fields in a data packet that the INE will leave unencrypted. Many times, the INE will take those fields and make them the header of an encrypted data packet. The CAPTAIN® protocol of the disclosure utilizes the fields that will be isolated from encryption based on the type of data packet being sent and the INE being used. The CAPTAIN® uses a PEP adapter to populate those isolated fields with bits that equate to a message readable by other PEP adapters in different networks. By making these fields readable in both plain-text and cypher-text networks, the techniques of this disclosure allows for the implementation of PEP functions across INEs (e.g., HAIPE® devices). In place of a PEP adapter, the techniques of this disclosure could also use software components, routers, Wide-Area Network (WAN) optimization appliances, or radios, among other things.

As mentioned above, some configurations of an INE, namely a HAIPE® encryption device in bypass mode, although other INEs could also be used, will leave some bits of IPv4 and IPv6 data packets unchanged. These unchanged bits are also called pass-through fields. The techniques of this disclosure (referred to here as CAPTAIN® Signaling Protocol (CSP)) will make use of these bit fields to transfer signaling data across the INE. In this disclosure, the one or more fields of a data packet that are let unencrypted by an INE will be generically referred to as "pass-through fields." If a CAPTAIN®-enabled PEP adapter is placed on each side of each INE, the unchanged pass-through fields can be read across networks and unencrypted messages between PEP adapters and networks can be sent. When one of these messages may be sent between PEP adapters, a start of signal (SOS) packet will be sent, followed by relevant data packets, and then an end of signal (EOS) packet. These unencrypted bits in the pass-through fields may be used to implement PEP functions, thus alleviating many of the issues keeping INEs from being a more commonly used INE in IP-based tactical networks.

For example, the unencrypted messages placed in the pass-through fields may allow PEP adapters to distinguish individual TCP flows and to perform per-flow load balancing by disaggregating individual TCP flows. These messages may also allow networks to determine if communications are being blocked by a denial of service attack by allowing PEP adapters to communicate with other PEP adapters to determine the number of packets seen on the Red-side of an INE and the amount of packets sent through the Black-side of an INE. Delay tolerant networking (DTN) proxy functions will be able to designate the bundle boundaries of a DTN flow over an INE, ensuring that bundles are buffered and transferred appropriately until they eventually emerge again into a Red-side network. PEP adapters already have built-in network sensing functionality, meaning that Black-side PEP adapters can report bandwidth and bit error rate information to the Red-side PEP adapters. Quality-of-service (QoS) management also become viable, as PEP adapters can now communicate with one another in a way that allows the reservation of bandwidth to occur across Red and Black networks. In multicast systems, bandwidth may be saved in Black networks by tagging individual flows, allowing the receiving side to subscribe to individual streams within the larger tunnel including source-selective subscriptions. If there is congestion in a multicast system, CSP will tag data flows and assign flows to a-priori defined priorities, later using decision logic to add and drop flows on a dynamic basis. Other benefits from the use of CSP and the PEP adapters in an INE IP-based tactical network are certainly possible, as the above functionalities are only examples of what a CAPTAIN®-enabled PEP adapter could add to an INE network. Specific examples of PEP functions that may be enabled by using the techniques of this disclosure will be discussed below with reference to the following figures.

Using the examples above in combination with CAPTAIN® described above, Red-to-Red signaling 22 involves populating the pass-through fields of a data packet at Red-side router 16A, sending the data packet through INE 18A to Black-side router 20A, where it may be forwarded through black network 12A to Black-side router 20B, INE 18B, and, eventually, Red-side router 16B, where the pass-through fields are read. Although this example uses Red-side routers 16A and 16B, any Red-side routers enabled with this capability can send and receive data packets in this manner. Red-to-Black signaling 24 involves populating the pass-through fields of a data packet at Red-side router 16A, sending the data packet through INE 18A to Black-side router 20A, where the pass-through fields are read. Although this example uses Red-side router 16A and Black-side router 20A, any associated Red-side and Black-side routers enabled with this capability can send and receive data packets in this manner.

Each Black-side router 20 may be located in an untrusted Black network or multicast region 12. A Black-side router 20 can also be a multicast gateway, as described later in this disclosure.

Sender terminal node 4 may be located in Red Network 10A, and receiver terminal nodes 6A, 6B, and 6C (collectively, receiver terminal nodes 6) are located in Red Networks 10B and 10C, respectively. The rendezvous point (RP) 14 may be placed anywhere in any red network, such as Red Network 10C, and other Red-side routers 16A, 16B, and 16C (collectively, Red-side routers 16) obtain the address of RP 14 through embedded-RP, a bootstrap mechanism, or static configuration, as deployed in the network 2. An RP acts as the meeting place for sources and receivers of multicast data, holding dynamic lists of subscription information within a given system in a shared tree.

For receiver terminal node 6C in the same network as the RP 14, Joins/Prunes to the shared tree will be sent by the routers towards the RP 14. A join operation may be executed by a router when the router is instructed to begin receiving a multicast stream from a given terminal node, and a prune operation may be executed by a router when the associated red network has no terminal nodes that are subscribing to a given multicast stream anymore. For receiver terminal nodes 6A and 6B in another red network, the Joins/Prunes towards the RP 14 are propagated towards the Red-side router 16A and 16B connected to the INE 18A and 18B fronting the network. Instead of continuing PIM Joins/Prunes upstream towards the RP 14 (which could be blocked by the INE 18B anyway), Red-side router 16B sends "Join-Black"/"Prune-Black" to Black-side router 20B, using the Red-to-Black (R2B) signaling 24, which maps Join/Prune to the PT group (*,m) to Join/Prune to the CT group (*, M). Red-side router 16B also starts Red-to-Red (R2R) 22 and sends a unicast "Join-Red"/"Prune-Red" towards the RP 14, which are specific join and prune operations directed towards a specific Red router. "Join-Red"/"Prune-Red" signaling packets are 'tagged' packets so that they can be intercepted by the Red-side router 16 in the receiving network, i.e. Red-side router 16C, after traversing the black clouds 12A and 12B (collectively, black cloud 12) on the way to the RP 14. After receiving the R2R signaling packets through packet snooping, Red-side router 16C adds/deletes Red-side Router 16B in its "Receiver Red-side Router" list, a list of states a Red-side router keeps for its 'downstream' red routers, where the state indicates whether a particular Red-side is or is not a receiver. Red-side router 16C continues PIM Join/Prune towards RP 14, to join/leave the shared tree. Red-side router 16B checks its "Receiver Red-side Router" list and prunes itself from the shared tree if all its 'downstream' red routers have left the shared tree.

The unicast Registration and Registration-Stop messages will be sent between Red-side routers, and they will be protected by the INEs as they traverse the network 2. These messages are sent when a Red network becomes active or inactive, respectively. If the sender terminal node 4 happens to be in the same network as the RP 14, these messages will bypass the INEs 18. Registration-Stop will be sent after RP 14 joins the source tree and starts to receive native multicast packets from the sender terminal node 4, or when there are no downstream routers. RP 14 also prunes itself from the source tree when all its downstream routers have left the shared tree. Join/Prune to the source tree by the RP 14 are similar to those by the receiver terminal nodes 6, which are described below.

Source-specific Joins/Prunes are sent by a receiver terminal node's designated router 16 and by the RP 14 to join/leave the source tree. Source-specific joins and prunes are join and prune operations that are directed at a specific terminal node rather than a red network in general. For receiver terminal nodes 6, or the RP 14, located in the same Red network 10A as the sender terminal node 4, source-specific Joins/Prunes will be sent from the prospective receiver terminal node to the sender terminal node 4. For receiver terminal nodes 6 or RP 14 located in a different network than the sender terminal node 4, source-specific Joins/Prunes towards the sender terminal node 4 will reach the Red-side router 16 connected to the INE 18 fronting the receiver network 10. In the above example, Red-side router 16B receives source-specific Joins/Prunes from its downstream routers, for receiver terminal nodes 6A and 6B, while Red-side router 16C receives source-specific Joins/Prunes from its downstream routers, for receiver terminal node 6C. Instead of continuing the usual source-specific Joins/Prunes upstream towards the sender terminal node (which could be interrupted by the INE), Red-side router 16B and Red-side router 16C send "SSM-Join-Black"/"SSM-Prune-Black" to Black-side router 20B and Black-side router 20C, respectively, using the R2B signaling 24, which translates SSM Join/Prune for source-group (4, m) to SSM Join/Prune for source-group (18A, M). Red-side router 18B and Red-side router 18C also start R2R 22 and sends a unicast "SSM-Join-Red"/"SSM-Prune-Red" towards the sender terminal node 4. "SSM-Join-Red"/"SSM-Prune-Red" packets are also 'tagged' packets, similar to "Join-Red"/"Prune-Red" packets in R2R signaling 22. These packets will be intercepted by the Red-side router 16A at the source Red network 10A as they travel towards the sender terminal node 4. After receiving the R2R signaling packets through packet snooping, Red-side router 16A adds/deletes Red-side router 16B and Red-side router 16C in its "SSM-Receiver Red-side Router" list, accordingly. "SSM-Receiver Red-side Router" may be a state each source Red-side router 16 keeps for its source-specific 'downstream' routers. Red-side router 16A continues PIM source-specific Join/Prune towards sender terminal node 4, to join/leave the source tree. Red-side router 16A checks its "SSM-Receiver Red-side Router" list and prunes itself from the source tree if all its source-specific 'downstream' red routers have left the source tree.

In some examples in accordance with this disclosure, a communication system for an adaptive multicast network may be provided. In this system, a rendezvous point archives multicast subscription information for one or more terminal nodes in the adaptive multicast network, wherein the multicast subscription information comprises a dynamic list of receiver terminal nodes located within the adaptive multicast network that subscribe to particular multicast streams from one or more terminal nodes in the adaptive multicast network. A router may receive a multicast stream from a sender terminal node and the multicast subscription information for the multicast stream sent by the sender terminal node from the rendezvous point. The router may forward the multicast stream to all receiver terminal nodes in the dynamic list of receiver terminal nodes indicated as subscribing to the multicast stream sent by the sender terminal node. In other examples, the adaptive multicast network may be divided into a plurality of trusted networks, and wherein the rendezvous point may be in a first trusted network, and wherein the router and the sender terminal node are in a second trusted network.

In some examples, the dynamic list of receiver terminal nodes may be updated, wherein updating the dynamic list of receiver terminal nodes. A join request may be sent from one of the plurality of terminal nodes in a first trusted network to a router in the first trusted network when the terminal node is requesting to receive a multicast stream. A prune request may be sent from one of the plurality of terminal nodes in a first trusted network to a router in the first trusted network when the terminal node is requesting to cease to receive a multicast stream. The router in the first trusted network sends the join or prune request towards the rendezvous point. A router in a second trusted network intercepts the join or prune request, wherein the second trusted network may be in the same trusted network as the rendezvous point. The router in the second trusted network updates a receiver router list based on the instructions in the join or prune request. The router in the second trusted network forwards the join or prune request from the router in the second trusted network to the rendezvous point. The rendezvous point updates the dynamic list of receiver terminal nodes. In some further examples, each trusted network contains an inline network encryptor and a router, wherein each router uses a signaling protocol to communicate with other routers in the adaptive multicast network, wherein the signaling protocol inserts information into pass-through fields of a data packet, wherein the information in the pass-through fields is not encrypted when the data packet passes through the inline network encryptor and can be read at other routers.

In some examples in accordance with this disclosure, a method of source-specific multicast registration is described. In these examples, one of the plurality of terminal nodes in a first trusted network sends a source-specific multicast join request to a router in the same trusted network when the terminal node wants to receive a multicast stream. One of the plurality of terminal nodes in the first trusted network sends a source-specific multicast prune request to the router in the same trusted network when the terminal node wants to cease receiving a multicast stream. The router in the first trusted network sends the source-specific multicast join or prune request towards the sender terminal node, wherein the sender terminal node may be in a second trusted network. A router in the same trusted network as the sender terminal node intercepts the source-specific multicast join or prune request sent to the sender terminal node. The router in the second trusted network updates a source-specific receiver router list based on the instructions in the source-specific multicast join or prune request. The router in the second trusted network forwards the source-specific multicast join or prune request to the sender terminal node. The sender terminal node updates a source tree at the sender terminal node based on the instructions in the source-specific multicast join or prune request. In some examples including this method, each trusted network contains an inline network encryptor and a router, wherein each router uses a signaling protocol to communicate with other routers in the adaptive multicast network, wherein the signaling protocol inserts information into pass-through fields of a data packet, wherein the information in the pass-through fields is not encrypted when the data packet passes through the inline network encryptor and can be read at other routers.

In some examples in accordance with this disclosure, each multicast region may be a mobile ad hoc network (MANET).

Figure 2:
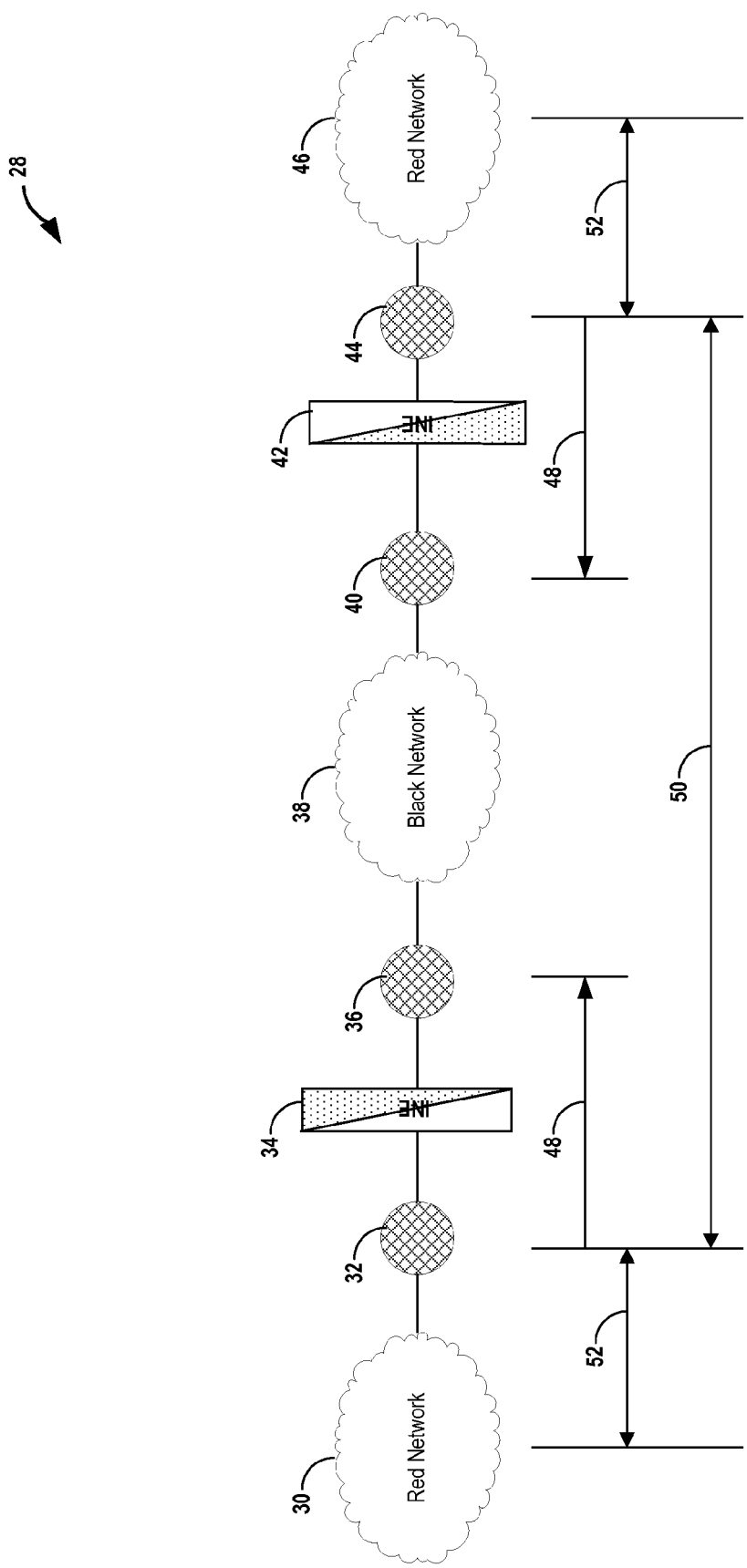
FIG. 2 is a block diagram illustrating an INE-compliant multicast signaling according to one example of the disclosure.

FIG. 2 is a block diagram illustrating INE-compliant multicast signaling according to one example of the disclosure. In one example, the INE-compliant multicast signaling techniques may be HAIPE®-Compliant Multicast Signaling Protocol (HC-MSP). HC-MSP may be configured to overcome the unique challenges of multicast communication in crypto-partitioned networks, where multicast signaling (such as PIM) may be blocked and multicast addresses are mapped by INEs, as illustrated in FIG. 2.

In a typical multicast operation under this environment 28, a multicast packet with a source and group pair (s, m) in the red network 30 will be routed as (h, M) in the black network 38, where h may be the CT address of the HAIPE® fronting the red network 32 and M the black multicast group. The black network 38 can have the same PIM protocol as the red network 30, or an entirely different multicast routing protocol, such as Dynamic Adaptive Hybrid Multicast Routing (DAHMR), if it is a MANET. HC-MSP can be used to uniformly enable multicast signaling across an INE and seamlessly interconnect heterogeneous multicast routing domains on the two sides of the INE.

The HC-MSP module can be installed as software extension to the Red-side routers 32 and 44 and the Black-side routers 36 and 40 on each side of the INEs 34 and 42. The Red-side routers 32 and 44 can have a local-area network (LAN) attached as well as being connected to other routers in the red networks.

For example, multicast signaling packets coming from a host or a router within the red network 30 will reach the Red-side router 32, which in turn converts it into signaling packets to the Black-side router 36 on the black side as well as signaling packets to the Red-side router 44 of a relevant red network 46. As shown in FIG. 2, HC-MSP includes a Red-To-Black (R2B) signaling mechanism 48 handling multicast signaling from the Red-side routers 32 and 44 to the corresponding Black-side router 36 and 40, respectively, and a Red-To-Red (R2R) signaling mechanism 50 handling multicast signaling between the Red-side routers 32 and 44. Signals 52 can also be sent between the red networks 30 and 46 to the corresponding Red-side routers 32 and 44. Both R2B 48 and R2R 50 mechanisms comply with various INE security policies.

HC-MSP supports both PIM-DM and PIM-SM (including protocol independent multicast in source specific mode (PIM-SSM) and bidirectional protocol independent multicast (PIM-BiDir)) in the red networks. PIM protocols can be deployed "as is" within the networks, with all the PIM entities in the red networks 30 and 46 operating as though the red networks 30 and 46 were directly connected to form a unified network. No changes are needed to the other routers and hosts in the red networks 30 and 46, except the router connected to the INEs 34 and 42 (e.g., Red-side routers 32 and 44), which will implement the R2B 48 and R2R 50 signaling. Requirements to add software extensions to the Red-side routers 32 and 44 connected to the INEs 34 and 42 will be eliminated if the R2B 48 and R2R 50 signaling functions are to be implemented as a software extension to the INEs 34 and 42.

The Red-To-Black (R2B) signaling mechanism 48 performs signaling from the red-side routers 32 and 44 to the black-side router 36 and 40, respectively, with which the Red-side router is "partnered". The Red-side routers 32 and 44 receive explicit PIM Joins/Prunes including SSM Joins/Prunes from their downstream neighbor routers within their networks, and also monitor the Internet group management protocol (IGMP) subscription status if a LAN is attached. The Red-side routers 32 and 44 react to multicast subscription changes by sending a sequence of packets to the corresponding black-side routers 36 and 40 to signal corresponding changes needed in the black network 38.

Two example options are discussed for implementing the R2B mechanism 48. In the first option, R2B will leverage the design of CSP for INEs, which may be a multipurpose signaling protocol for Performance Enhancing Proxy (PEP) operations in crypto-partitioned networks, as described above. CSP uses a Start of Sequence (SOS) and an End of Signal (EOS) packet pair to indicate the start and the end of a message sequence. Intermediate packet(s) sandwiched between the SOS and the EOS, are the "data" packets that contain information to be conveyed from the Red-side routers 32 and 44 to the partnered Black-side routers 36 and 40, respectively.

This uses the INEs 34 and 42 allowing for 3 fields of an IPv6 packet header to be copied from the PT header of a packet to the CT header of the packet for tunnel mode security associations (SAs). These are the Traffic Class (8 bits), the Flow Label (20 bits), and the Hop Limit (8 bits). Note that the Hop Limit may be decremented by two when it arrives on the black side rather than actually being copied. These IPv6 header fields are used by the R2B 48 to convey signaling commands and information from the Red-side routers 32 and 44 to the partnered Black-side routers 36 and 40, respectively, and only to that partnered Black-side router 36 or 40. These data packets are shown in greater detail with respect to FIGS. 8A-8D. The general operation of the R2B mechanism 48 is as follows.

Each Black-side router (36 or 40) which is paired with a Red-side router (32 or 44) "subscribes" to a well-known site-local multicast address, the Red-Black Multicast address (RBMC), and the INE (34 or 42) that sits between each partnered pair of Red-side router/Black-side router is configured to have a security association for the RBMC address.

An R2B message 48 consists of a sequence of two or more consecutive IPv6 (and/or IPv4) packets sent from the Red-side router 32 or 44. The first packet in a R2B signaling sequence 48, the Start of Sequence (SOS) is always IPv6 and is always addressed to the RBMC address. FIG. 8A is the IPv6 packet header for the Start of Signal (SOS) packets. Signaling packets have no payload data. The SOS uses the 8-bits of the Traffic Class field as a "signal-code". The value 0 is reserved for use in an End of Signal (EOS) packet (described below), allowing for 255 different unique signal-codes.) The 20-bits of the Flow Label may optionally include a data field specific to a particular signal-code.

The 8-bit Hop Limit field is set with the total number of data packets (intermediate packets in the signaling sequence sandwiched between SOS and EOS). For a signaling sequence which consists of no data packet the Hop Limit is set to 2 on the Red-side router and arrives at the Black-side router with a value of 0. For a signaling sequence consisting of n packets (n>0) the Red-side router 32 or 44 sets the Hop Limit field in the SOS with the value of n+2, and this value arrives at the Black-side router 36 or 40 as n, indicating that the sequence will contain n consecutive data packets. Note that the data packets may or may not be addressed to the RBMC address and may be either IPv4 or IPv6 packets (depending upon the particular signal-code).

As a consistency check, the last packet in signaling sequence, the End-of-Signal (EOS) packet, will always be an IPv6 packet addressed to the RBMC address and have the reserved signal-code of 0 in the Traffic Class field along with a Hop Limit value of 0 (when received at the Black-side router), as shown in FIG. 8B. The Flow Label field of this final packet in the sequence may optionally contain 20 bits of signal-code specific data.

Note that a multi-packet R2B sequence 48 may be carried in consecutive packets—no other traffic is sent from the Red-side routers 32 and 44 to the partnered Black-side router 36 or 40 until the sequence is completed. Also note that any R2B packets addressed to the RBMC address are always consumed by the partnered Black-side router 36 or 40. These packets are never forwarded any further into the black network 38. For R2B signaling 48, the intermediate data packets of a multi-packet signaling sequence are also consumed by the Black-side router 36 or 40 and never forwarded into the black network 38 in the R2B signaling 48.

In the R2B signaling 48, multicast signaling may be indicated by the signal-code, and Join/Prune may be indicated in Flow Label. To signal any-source multicast Join/Prune for a PT group m (*, m), the SOS may be followed by a single multicast packet addressed to m. This packet arrives at the Black-side router 36 or 40 with the group address changed to a CT multicast address, say, M, due to the INE security association set up for the multicast channel. Thus, the Black-side router 36 or 40 obtains the information about which CT multicast group (i.e. M) it should Join/Prune on the Black network 38, resulting in a Join/Prune to (*, M) on the black side. For source-specific Join/Prune on the PT side, say, (s, m), the SOS may be followed by 2 packets. The first packet may be exactly the same as in any-source Join/Prune. The second packet may be a unicast packet addressed to s, which arrives at the Black-side router 36 or 40 as a packet addressed to the INE fronting the source s. Thus, Black-side router 36 or 40 obtains information about the source INE it should join/prune multicast traffic in the black network 38. If there is more than one source in Join/Prune, say, n sources, the Red-side router 32 or 44 sends a unicast packet to each of the sources, resulting in n+1 data packets, and a total of n+3 packets including SOS and EOS in a signaling sequence. For multiple-group Join/Prune, the Red-side router 32 or 44 simply creates multiple sequences for signaling, each corresponding to a multicast group.

A second example to implement R2B 48 does not require RBMC to be set up at the INEs 34 and 42 and may be designed to work for the multicast signaling purpose only. In this option, the SOS and EOS packets are sent using the same multicast channel targeted for R2B signaling 48. A new multicast packet may be created by the Red-side router 32 or 44 and addressed to the PT multicast group (m). A total of three unassigned values in Traffic Class (for IPv6 multicast) or in DSCP (for IPv4 multicast) will be reserved for the R2B signaling 48. Two of these values are used to indicate that it is a SOS packet, one value indicating the SOS for Join, the other indicating the SOS for Prune. Another multicast packet may be created to be addressed to the same multicast group but uses the third reserved value in Traffic Class or DSCP to indicate the EOS. The intermediate data packets remain the same as those in the first option, except that the first packet in a data packet sequence (used to convey multicast group information) is no longer needed now since multicast group information is already implicitly conveyed to the black side in the SOS packet as the SOS packet arrives at the Black-side router 36 or 40 with the multicast group mapped to M by the INE.

In both of the R2B signaling options described above, the Red-side routers 32 and 44 maintain the multicast subscription status of their downstream routers (and/or hosts if they are directly connected to the Red-side routers 32 and 44) in the red networks 30 and 46 and issue a pruning signal to the partnered Black-side router 36 or 40 only after all the interested downstream terminal nodes have left a group. If multiple PT multicast groups are mapped to a single CT multicast group, a pruning signal may be sent only when none of the PT groups mapped to a single CT group has any interested downstream terminal nodes.

To further improve bandwidth efficiency in the black network 38, CSP, as described above may be leveraged for performance-enhancing multicast traffic management. In this signaling approach, a priori information may be configured into both the Red-side routers 32 and 44 and the Black-side routers 36 and 40 to map source and/or destinations to one of the Flow Label/DSCP bits. This allows the Black-side routers 36 and 40 to distinguish the traffic sources and assign each a unique source address on the black network 38. The Red-side routers 32 and 44 monitor the PIM Joins/Prunes (or IGMP Joins/Leaves) within the red networks 30 and 46, respectively, and determine if a multicast Join or Prune to the Black-side routers 36 and 40 may be necessary. The Red-side routers 32 and 44 use a well-known multicast channel (i.e. RBMC) to send an alert for multicast Join/Prune to the corresponding Black-side router 36 or 40. The Red-side routers 32 and 44 then send a multicast data tagged packet with ToS bits set to the network address translation (NAT) index that should apply the Join/Prune.

One advantage of this approach is that it does not break the INE rules for crypto-separation since it is not sending any PT-side addresses, but an index into a table set-up prior to the exercise, known only on the PT-side, indicating the mapping between the PT-side multicast stream and the index offset. Signaling is used to implement Source NAT functionality within the black network. Each PT-side multicast stream is assigned a unique black side source address, which is used on the black side to control multicast traffic through the tunnel. Source-specific multicast traffic control in the black MANET will be handled by the SSM routing broadcast methods implemented in AIM-AN's DAHMR described with respect to FIG. 3.

HC-MSP uses the Red-To-Red (R2R) signaling mechanism 50 to handle multicast signaling between Red-side routers 32 and 44 for multicast Join/Prune operations spanning multiple red networks 30 and 46. An explicit Join/Prune message (such as PIM Join/Prune and SSM PIM Join/Prune) between the Red-side routers 32 and 44 located in separate red networks 30 and 46 are encapsulated in a unicast user diagram protocol (UDP) packet. Addressing of the UDP packet depends on the Join/Prune operation. If the sender Red-side routers 32 and 44 want to join the shared tree of an RP (for PIM-SM) located in another network, the packet may be addressed to the RP. If the sender Red-side router 32 or 44 wants to join a source tree located in another network, the packet may be addressed to the source. Another unassigned value in Traffic Class (for IPv6 multicast) or in DSCP (for IPv4 multicast) will be reserved for the R2R signaling 50. This value may be used to "tag" the unicast UDP packet. The tagged packet travels along the red-black-red route, protected by the INEs in the black network 38. After arriving at the receiving network, the receiving Red-side router 32 or 44 detects the "tag" and "consumes" the packet by unencapsulating the PT UDP packet and processing the Join/Prune data in the packet. The tagged packets are consumed by the receiving Red-side router 32 or 44 and only by the receiving Red-side router 32 or 44 (the Red-side router that fronts the intended destination of the packet), and never forwarded on to the destination (i.e., the RP or the source).

In some examples, an Inter-INE Multicast Coordination tool may be further added to the AIM-AN. The Inter-INE Multicast Coordination tool may consist of two software components: HAIPE® Multicast Server (HMS), and HAIPE® Multicast Agent (HMA). The following paragraphs list the major functions of these two components.

The HAIPE® Multicast Server (HMS) typically resides within a red network of a major base and provides many primary functions. An HMS may be a registration service for remote HMAs. The HMS controls membership for multicast COI groups. The HMS schedules service for multicast security configuration with an Admin Interface. The HMS specifies start time and end time of a multicast session and security association for multicast channel(s) across the INE devices. The HMS also schedules push to relevant remote HMAs.

HAIPE® Multicast Agents (HMAs) reside within a remote red network as well as locally with the HMS and implement registration to the HMS. HMAs also schedule execution on the fronting HAIPE® device. HMAs setup of security associations at the beginning of a multicast session and takedown security associations at the end of a multicast session. HMAs can act as an IGMP proxy, if needed. HMAs can take down multicast routes through IGMP override that corresponds to security. HMAs can take down associations. HMAs can also remove unnecessary multicast routes that may still be alive after security association takedown.

Figure 3:
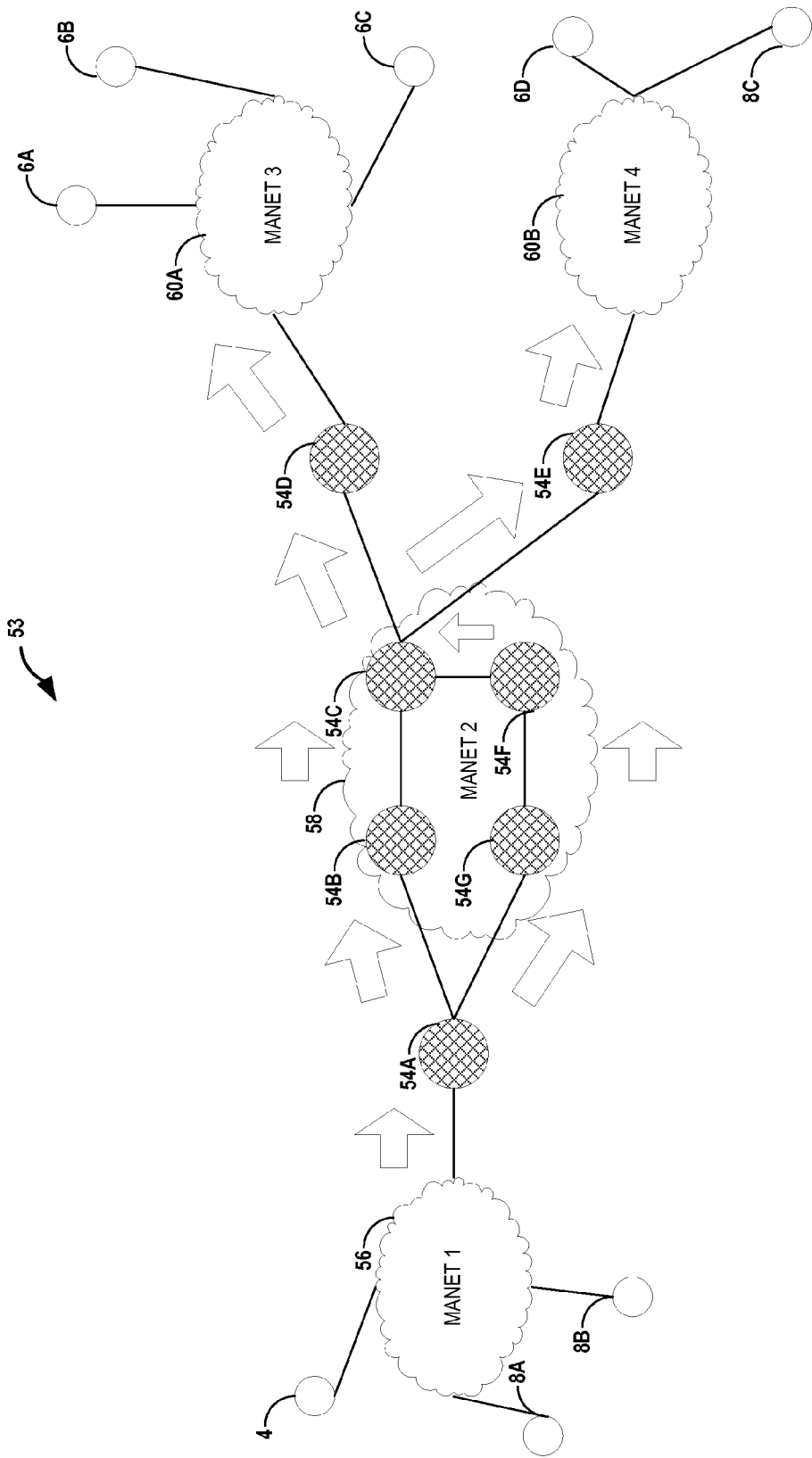
FIG. 3 is a block diagram illustrating dynamic multicast routing according to one example of the disclosure.

FIG. 3 is a block diagram illustrating a dynamic multicast routing concept. In Dynamically Adaptive Hybrid Multicast Routing (DAHMR), a large multicast network can be divided into multiple separate multicast regions interconnected by the gateways. A set of multicast delivery algorithms will be implemented as an add-on software module to existing routers within each multicast region. Multicast delivery algorithms are dynamically determined according to the characteristics of each multicast region, such as multicast group size and terminal node mobility. As multicast conditions can vary significantly in time as well as between the regions, a hybrid of multicast protocols may be in use at any given time across the network to distribute multicast data to receivers with optimal utilization of network resources.

In the design of DAHMR, the signaling protocol for Unified Multicast through Announcements (PUMA) may be leveraged and PUMA's mesh routing with novel mechanisms for tree-based routing, as well as source-specific multicast routing for the MANET, may be augmented. An innovative mechanism to facilitate automatic adaptation of the routing broadcast methods to real-time network conditions in the MANET may be introduced.

FIG. 3 illustrates the concept of the hybrid multicast routing that may be deployed for airborne networks. In this example, the network 53 for a multicast group is composed of four mobile ad hoc networks 56, 58, 60A, and 60B, i.e., MANET1 through MANET4. A multicast sender 4 is located in MANET 56, which is a Tactical Targeting Network Technology (TTNT) network. The IP multicast addresses are mapped by the waveform in MANET 56 into TTNT multi-hop multicast addresses. Multicast packets are transmitted using the native multicast transport already implemented in TTNT. Router 54A, a gateway in TTNT subscribing to the multicast group through TTNT's multicast group subscription protocol, connects MANET 56 to the rest of the multicast network. Similarly, routers 54D and 54E connect their respective MANETs, 60A and 60B respectively, to the rest of the multicast network.

In general, DAHMR will allow a MANET to alternate between multiple routing broadcast protocols based on the concentration and mobility of receiver terminal nodes residing in that specific MANET. A MANET with a low concentration of receiver terminal nodes or having receiver terminal nodes with low mobility may use a tree-based routing broadcast protocol to most efficiently send a multicast stream to the receiver terminal nodes residing in that MANET, taking into account the speed of delivering the stream to the various receiver terminal nodes while using as little bandwidth as possible within the network. Using those same factors, when a MANET has a higher concentration of receiver terminal nodes or has receiver terminal nodes with a higher mobility, a mesh-based protocol may be the most efficient routing broadcast protocol. If the concentration of receiver terminal nodes becomes even more dense or the receiver terminal nodes have an even higher mobility, a network flooding protocol may be the most efficient routing broadcast protocol. By using DAHMR, a MANET will be able to monitor the concentration and mobility of the receiver terminal nodes within the MANET and dynamically change the routing broadcast protocol employed by the MANET to distribute a given multicast stream.

MANET 58, MANET 60A and MANET 60B have differing characteristics in terminal node mobility and multicast membership. MANET 58 consists of relatively persistent routers 54B, 54C, 54F, and 54G, and stable links supported by a link-state protocol such as open shortest path first (OSPF) with MANET extension. MANET 60A and MANET 60B have time-varying characteristics in terminal node mobility and group membership. For instance, at the beginning of a multicast application, MANET 60A has a high proportion of terminal nodes (6A, 6B, 6C) participating as a receiver in a multicast communication and relatively high terminal node mobility, while MANET 60B has a low proportion of receiver terminal nodes (6D) in the multicast receiver group and relatively low mobility. Later on, some receiver terminal nodes will move from MANET 60A to MANET 60B and mobility will also change in the two regions. Under these conditions, an appropriate algorithm for MANET 58 could be an OSPF multicast extension, which could incur minimal overhead as link status is already provided by the unicast routing protocol. MANET 60A and MANET 60B could use DAHMR to dynamically adapt the delivery mechanism to the changing characteristics in the region. For MANET 60A, a mesh-based algorithm or simply a flooding algorithm could be dynamically switched on by the DAHMR routers within the region and later on a mobility-enhanced tree-based delivery algorithm will be dynamically switched. For MANET 60B, DAHMR could start with a mobility-enhanced tree-based algorithm. Later on, as more terminal nodes move into the MANET 60B region and/or mobility increases, a mesh-based delivery could be dynamically switched on by the DAHMR routers in the region.

One feature of DAHMR is that it uses a dynamic election method based on the mobility of the terminal nodes to provide a relatively stable core, a contact point of a multicast group in the region. Since the core is dynamically elected, a new core will be quickly elected if a terminal node that has been previously elected as the core has moved away from the region, avoiding single point failures. Unlike many other MANET multicast routing protocols, DAHMR supports source-specific multicast (SSM), which allows multicast receivers to indicate which senders they should receive multicast data from. DAHMR uses unified multicast announcements piggy-backed with source-specific subscription data and allows multicast delivery structures to be pruned so that multicast data will not be sent to branches where there are no interested receivers, further reducing bandwidth overhead in the MANET.

The DAHMR design extends the proven Protocol for Unified Multicast through Announcements (PUMA) technology. The original PUMA protocol is a core-based multicast routing protocol that uses a mesh to forward data packets to the receivers. A core is dynamically elected by the receivers to serve as a point of contact for each multicast group. Every receiver connects to the core along all shortest paths between the receiver and the core. All the terminal nodes on the shortest paths form the mesh that will forward the data packets in a way that eliminates duplicate packets. A sender sends a data packet to the group along a shortest path towards the core. Once it reaches a mesh member terminal node, the data packet is flooded within the mesh.

PUMA uses a single control message, i.e. multicast announcement, for all its functions to create and maintain the routing structure. Each multicast announcement includes a core ID, a group ID, a sequence number, a distance to core, a Parent ID, and a mesh member. A core ID is the ID of the core for a multicast group. A group ID is the ID of a multicast group. A sequence number is a number identifying the sequence of the announcements. A distance to core is the number of hops it could take to get from the terminal node to the core. A parent ID is the ID of a neighboring terminal node that is closer to the core. A mesh member is a flag set to indicate whether the terminal node is a member of the mesh.

Multicast announcements are broadcast periodically from the terminal nodes to perform functions such as dynamic core election, identification of the shortest route for any source to unicast data packet towards the group, join and leave of the group by a receiver, and maintenance of the data delivery mesh for the group.

One advantage of PUMA is that the core does not have to be pre-assigned. Therefore, PUMA can be augmented with a dynamic core election method based on the mobility of the terminal nodes to provide a relatively stable core, which is critical for the success of the protocol in highly mobile networks. In the current implementation, a core is elected by the receivers simply by the terminal node's ID number, i.e. the terminal node with the highest ID number becomes the core of the group. To add mobility-aware core election, a single number could be added to the multicast announcement messages to indicate predicted mobility of the terminal node. For instance, the mobility coefficient may be assigned a number ranging from 0 to 3 (0—stationery, 1—low mobility, 2—medium mobility, 3—high mobility). Therefore, the terminal node with the lowest mobility coefficient will be elected as the core of the group. If multiple terminal nodes have the same lowest mobility coefficient number, terminal node ID will then be used as the tiebreaker to determine which terminal node becomes the core.

In AIM-AN's adaptive multicast routing, both mesh and tree routing broadcast methods will be implemented together with an adaptation scheme that allows dynamic change of the routing broadcast methods so that multicast data may be delivered efficiently to optimize bandwidth usage in airborne networks. Each of these features will be discussed in greater detail with respect to FIGS. 6 and 7.

In some examples of the current disclosure, a mobility coefficient is assigned to each terminal node in each of the trusted networks. A core terminal node is designated in each trusted network from the plurality of terminal nodes in each trusted network based on the mobility coefficient. A default routing broadcast protocol is set. One of the terminal nodes in one of the trusted networks sends multicast announcements to the core terminal node in that trusted network in the case that the terminal node is requesting to receive a multicast stream. The default routing broadcast protocol is then changed to a second routing broadcast protocol based on a concentration of terminal nodes that have requested to receive the multicast stream and based on the mobility coefficients assigned to each of the terminal nodes that have requested to receive the multicast stream. In other examples, the second routing broadcast protocol is further changed to a third routing broadcast protocol based on the concentration of terminal nodes that have requested to receive the multicast signal and the mobility coefficients assigned to each of the terminal nodes that have requested to receive the multicast signal. In some examples, the default routing broadcast protocol is a tree routing protocol, the second routing broadcast protocol is a mesh routing protocol, and the third routing broadcast protocol is a network flooding protocol.

Figure 4:
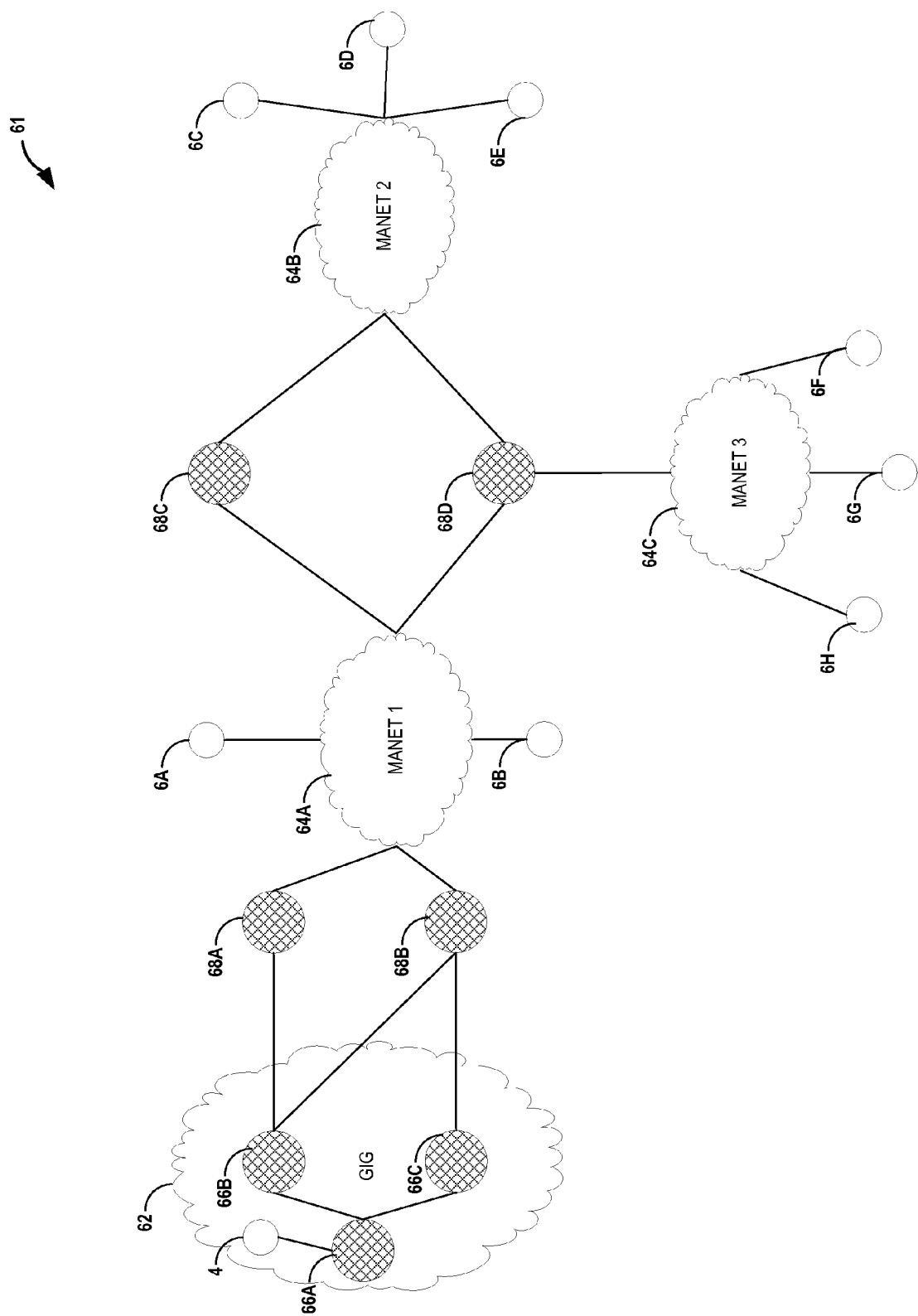
FIG. 4 is a block diagram illustrating a mobile ad hoc network with multicast gateway interconnection according to one example of the disclosure.

FIG. 4 is a block diagram illustrating a mobile ad hoc network with multicast gateway interconnection. Multicast regions with heterogeneous multicast routing protocols are interconnected through one or more Multicast Gateways (MG). Multicast Source Discovery Protocol (MSDP) interconnects multiple IPv4 PIM-SM domains for inter-domain multicasting and does not work for MANETs, since there is no Rendezvous Point (RP) in typical MANET multicast. The current disclosure allows interconnection among any MANET multicast protocols as well as between MANET and the fixed network (e.g. the global information grid (GIG)).

FIG. 4 shows an example 61 of multiple MANETs interconnected with each other and with the fixed backbone network (GIG) through the gateways. Two networks may be interconnected through multiple gateways, e.g. MG 68A and MG 68B connecting MANET 64A and GIG 62, and MG 68C and MG 68D connecting MANET 64A and MANET 64B. A multicast gateway may have more than two network interfaces, enabling them to interconnect more than two networks (e.g. MG 68D connecting MANET 64A, MANET 64B, and MANET 64C). A gateway may also have several host devices attached to it (not shown in FIG. 4). This gateway design takes into account these interconnection scenarios and allows dynamic discovery of multiple gateways in a single multicast region and automated coordination of the forwarding behavior among these gateways to optimize the bandwidth usage in the network.

In one example, the multicast gateway is designed as a software module that can be deployed as a software extension to the existing unicast routers. The multicast gateway generally implements multiple multicast routing protocols so that it can participate in multicast routing for the networks it interfaces with. For instance, if a gateway is connecting TTNT with an AIM-AN dynamic adaptive hybrid multicast routing (DAHMR) region, it should deploy TTNT multicast protocol on the TTNT interface and DAHMR on the DAHMR interface. In the current disclosure, multicast gateways are generally preconfigured to participate in the multicast routing protocol for each interface. In other examples, an enhancement may include elimination of this preconfiguration process using automatic discovery of the underlying multicast routing protocol for some regions.

To forward multicast packets from one multicast region to another, a gateway receives multicast packets from one or more incoming interfaces and sends them out through one or more outgoing interfaces. If a subscriber exists for multicast traffic from a specific source residing outside the region, the gateway generally sets itself as a receiver for the multicast traffic on the interfaces to the neighboring regions. The gateway aggregates the subscriptions for a group within a region for multicast sources outside the domain and sets itself appropriately on the interfaces to all the neighboring domains. If a subscription to a group contains no source information, the gateway becomes receiver of all sources for a group on the neighboring interfaces.

If the gateway connects a multicast region to one or more neighboring regions through multiple interfaces, it could receive duplicate packets from these interfaces. Furthermore, if a multicast region has multiple gateways to one or more neighboring regions, the gateways could potentially forward the same packets into the region.

Consider the example network 61 shown in FIG. 4. For a multicast group with sender 4 and receivers 6A and 6B in MANET 64A, MG 68B could receive duplicate data packets from the two GIG routers 66B and 66C it interfaces with, while MG 68A could receive the same packets from its GIG router 66B. Therefore, a packet could be forwarded three times into MANET 64A, once by MG 68A and twice by MG 68B. To address this potential issue, the multicast gateways will implement mechanisms for: 1) interface selection; and 2) gateway coordination. The Interface Selection mechanism is used by a gateway with multiple incoming interfaces to select the best interface to receive multicast packets. When multiple gateways are forwarding the same packets into a region, the Gateway Coordination mechanism is used to elect the multicast forwarder to stop the duplication.

AIM-AN's Multicast Gateways interconnect multicast regions with heterogeneous multicast routing protocols. The design of the MGs takes into account the complex scenarios in which multicast MANETs can be interconnected with each other and with the GIG, such as those shown in FIG. 4. Generally, to forward multicast packets from one multicast region to another, a gateway receives multicast packets from one or more of the incoming interfaces and sends them out through one or more of the outgoing interfaces. As mentioned earlier, if a subscriber exists for multicast traffic from a specific source residing outside the region, the gateway generally sets itself as a receiver for the multicast traffic on the interfaces to the neighboring regions. The gateway aggregates the subscriptions for a group within a region for multicast sources outside the domain and sets itself appropriately on the interfaces to all the neighboring domains. If a subscription to a group contains no source information, the gateway becomes a receiver of all sources for a group on the neighboring interfaces.

The gateway internally maintains an outgoing interface list (OIL) for each multicast source and group (S, G) pair or any source (*, G) if no source is specified. An entry is dynamically created in the OIL for an interface associated with a region in which there is at least one multicast subscriber for a source outside the region. Internet group management protocol (IGMP) messages are usually used to determine this subscriber status within a directly connected network segment. In a multi-hop MANET, however, the IGMP messages are usually not propagated between the gateway and the mobile terminal nodes. One way to implement IGMP in a MANET could be to propagate IGMP messages throughout the MANET using flooding. Flooding IGMP messages throughout the network, however, may incur excessive bandwidth overhead in the MANET. For bandwidth efficiency, a new protocol for DAHMR MANET for subscriber status discovery will be used that takes advantage of the unique multicast routing protocol in the region. For other MANET regions, a mixed broadcast and tunneling approach will be used to minimize bandwidth overhead. For the GIG gateway, a technique that leverages the presence of the popular PIM protocol in the GIG will be used.

DAHMR implements a hybrid of multicast delivery mechanisms for a MANET region and dynamically selects the most suitable mechanism to deliver multicast data to achieve optimized bandwidth usage. DAHMR is a receiver initiated multicast routing protocol. Receivers for a multicast group in a single multicast region dynamically elect a core to serve as the leader of the multicast group. Although the core may change over time due to membership dynamics in the region, the core exists at any given time as long as there is a receiver in the region. As the leader of the group, the core initiates multicast announcements (MA) periodically, which indicate the existence of subscribers in the region. Since the multicast gateways 68A-68D are themselves DAHMR terminal nodes participating in the multicast protocol, they receive and send MAs as well. As MAs reach the multicast gateways, they are implicitly notified of the existence of a receiver of a group, as well as the ID of the core. Since DAHMR supports SSM, receivers' source specifications are propagated along the shortest paths to the core. Therefore, multicast gateways can simply contact the core through unicast messages to obtain subscription status in the region, to create and adjust (S, G) or (*, G) entries in their respective OILs. Instead of periodically communicating with the core to obtain the subscription status, the multicast gateways register with the core to receive updates. The multicast gateways also implement a timeout mechanism so that the subscriptions will time out if no updates have been received from the core for a preset time interval. The core only needs to update the gateways when there is a change in subscription status, or at a preset time interval, in order to keep subscriptions alive at the gateways.

One technique for the gateways to determine multicast subscription status in a MANET that uses any multicast routing protocol other than DAHMR mimics the operation of IGMP but uses mixed broadcast and tunneling communications between the multicast gateways and the mobile terminal nodes. In this approach, the multicast gateways periodically broadcast their presence to the whole MANET region. Instead of propagating throughout the network, IGMP messages from a subscribing terminal node will be tunneled to the multicast gateways, since the terminal node has the knowledge of the multicast gateways.

Multicast gateways also have outgoing interfaces for GIGs. The black MANET will interconnect with the PIM-SM and the PIM-DM protocol in the backbone network GIG. For PIM-SM, a terminal node in the GIG joins a group through IGMP. A designated router joins a shared multicast tree rooted at the RP for the group. The routers in the shared tree prune themselves from the tree when there is no downstream receiver. Since the shared tree is rooted at the RP, the RP has the ultimate knowledge about whether there is a subscriber in the region for the group, by virtue of whether there is a downstream router for the group. The multicast gateway will use the PIM "Registration" scheme to determine if there is a need to forward multicast data from a source in an interconnected MANET, without the need to modify the RP. The multicast gateway sends unicast PIM "Register" messages to the RP, with the "Null-Register" bit set, and no encapsulated multicast packet, pretending it is a potential source. If it has no downstream router for the group, the RP will respond with a unicast "Register-Stop" message. The multicast gateway will start a 60-second "Register-Suppression" timer when it gets the "Register-Stop" message. With 5 seconds left on the Register-Suppression timer, the gateway router will send another "Register" message to the RP. If it receives another "Register-Stop" message from the RP, the gateway router will reset the "Register-Suppression" timer. This process will repeat until the RP has a downstream router joined, causing the RP to remain silent. Then the multicast gateway router's Register Suppression timer will expire, and the gateway knows that there are receivers in the GIG.

If PIM-SSM is used in the GIG, and if the source is located in a MANET region either adjacent to the GIG or connected through another MANET region, the gateway could eventually receive the join request as the join messages propagate towards the MANET. For PIM-DM, the gateway could periodically behave as if there are receivers in the GIG, until being notified otherwise, through the pruning messages.

Multicast gateways also have various incoming interfaces. Multicast packets may first reach the multicast gateway before they can be sent out through an interface specified in the OIL into another region. This can be achieved by the multicast gateway indicating an interest in receiving packets for (S, G) in OIL on an interface other than that specified in OIL, using the underlying multicast join protocol for the region. If a gateway has multiple incoming interfaces, it could randomly select an interface to receive the multicast packets. This could risk multicast traffic not reaching the multicast gateway through the best route or not reaching the multicast gateway at all, especially for (*, G) where source is unknown a priori. If the multicast gateway joins multicast delivery structure on multiple incoming interfaces, or, if a multicast region has multiple gateways to one or more neighboring regions, the gateways could potentially forward the same packets into the same region. The Interface Selection and Gateway Coordination mechanisms are designed to address this potential issue.

The Interface Selection mechanism is used by a multicast gateway for a MANET with multiple incoming interfaces (such as MANET 64A in FIG. 4, with interfaces for MGs 68A and 68B coming from the GIG 4, and interfaces for MGs 68C and 68D coming from MANET 64B) to select the best interface to receive multicast packets. For multicast joins with source specified, the multicast gateway will use the same three rules as those used by the PIM Assert mechanism to select the incoming interface, i.e. 1) lowest administrative distance; 2) best unicast routing metric; and 3) highest IP address of the interface. Considering the changing topologies in the MANET, the multicast gateway will periodically check the metrics in the interface selection rules and dynamically select the best interface to receive the data.

For a source multicast, the multicast gateway will initiate a join on all the possible incoming interfaces and then use a duplicate packet detection mechanism to prune 'slower' interfaces. The duplicate packet detection mechanism, which is always active in the multicast gateway, checks each incoming packet across the incoming interfaces for duplication. As soon as a duplicate packet is detected as coming from a second incoming interface, the multicast gateway will initiate a pruning process to remove itself from the multicast delivery structure on the interface it has received the duplicate packet. The advantage of this mechanism is that it ensures that the fastest interface (the interface that receives a packet first) is always selected to receive the data. Since the topology can change in the MANET, the multicast gateway will periodically repeat the join/prune process to ensure the best interface is used at all times.

When multiple gateways are forwarding the same data into a MANET, the Gateway Coordination mechanism is used to elect the multicast forwarder to stop the duplication. The original PIM Assert mechanism is used when multiple gateways are connected through a shared segment. For this to work in a MANET, two conditions are preferably met. First, incoming multicast packets forwarded by a multicast gateway should reach all the other multicast gateways in the region. Secondly, the Assert messages should be propagated to all the other multicast gateways in the region (to enable the election of a forwarding multicast gateway). A simple solution could be to have the multicast gateways join the multicast groups as receivers and propagate Assert messages throughout the region. This could incur very high bandwidth overhead as traffic from both internal and external sources will be sent to the gateways. For bandwidth-efficient operations, the following schemes could be used for the MANET gateway coordination.

In DAHMR regions, the multicast gateways will use the core of a multicast group to coordinate their forwarding behavior. Each multicast gateway internally keeps a record on the forwarding status, such as forwarded group and source, and the administrative distance and routing metric of the incoming traffic. It periodically sends that information to the core on a per group basis. The core uses the information sent from all the multicast gateways to select a multicast gateway to be the forwarder for a (S, G) pair based on the rules: 1) lowest administrative distance; 2) best unicast routing metric; and 3) highest IP address of the interface. The core selects a multicast gateway for the (S, G) pair by sending a unicast de-selection message to the other multicast gateways, with an expiration time. Considering the changing topologies in the MANET, the multicast gateway will periodically check the routing metrics for each interface and update the core with any new data. The multicast gateway continues to forward multicast data until de-selected by the core (through a unicast message from the core) or the de-selection time has expired.

Since the multicast gateways periodically broadcast their presence to the whole region for a non-DAHMR MANET, a multicast gateway has the knowledge of all the other multicast gateways in the region. The multicast gateways will unicast messages to coordinate their forwarding behavior. The multicast gateway will keep a record of their forwarding status, in the same way as in the DAHMR region. Instead of sending the data to the core, the multicast gateways send data to each other through unicast messages. The deselection process will be implicit in that the multicast gateways with the best metrics will continue to forward while other multicast gateways will cease to be a forwarder if there is a better multicast gateway available.

When multiple gateways send the same packets towards the RP, the best way to implement duplicate packet detection is on intermediate routers or the RP. The router or the RP then initiates a pruning process that will eventually reach the redundant multicast gateways. The multicast gateways that receive the pruning messages will then unsubscribe to the incoming interfaces to prune themselves from the MANET regions. Alternatively, the gateways connecting the GIG and tactical MANETs can directly coordinate their behavior for forwarding packets into the GIG, in a way similar to that in a MANET. Some kind of lookup service may be set up so that the gateways can find each other in an automated fashion, to avoid manual configurations.

In some examples in accordance with the current disclosure, at least one multicast regions have heterogeneous routing broadcast protocols and are interconnected with one or more multicast gateways, wherein the one or more multicast gateways are configured to implement multiple routing broadcast protocols, interface selection protocols, and gateway coordination protocols.

Figure 5A:
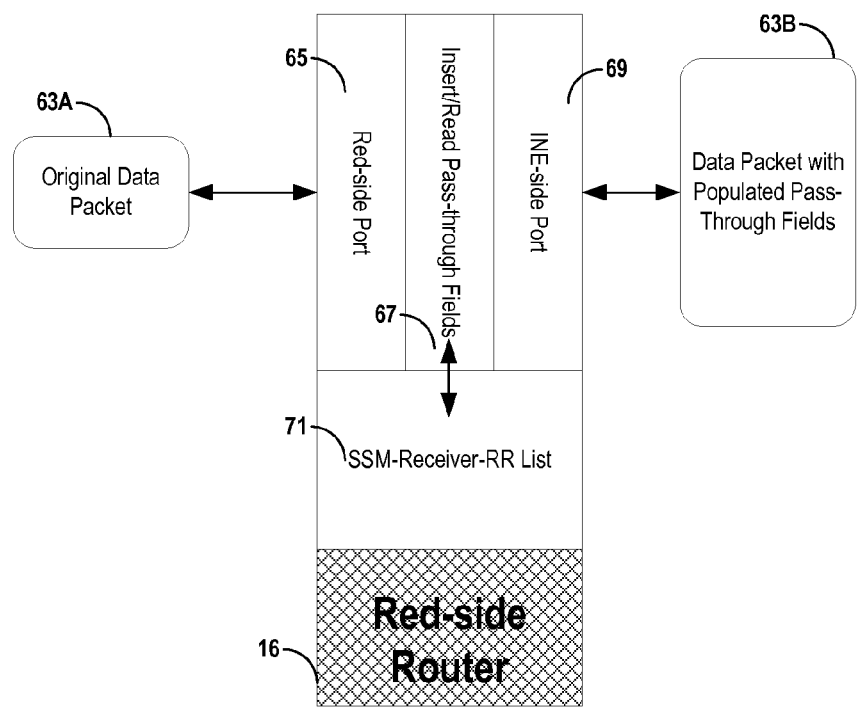
FIGS. 5A-5C are block diagrams illustrating the routers (Red-side, Black-side, and multicast gateway) in greater detail.
Figure 5B:
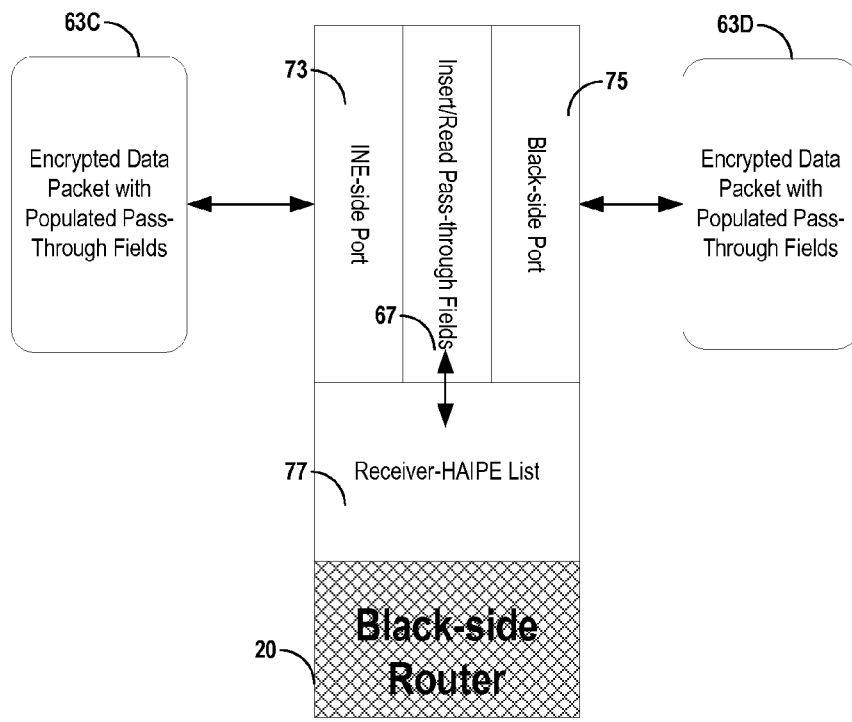
Figure 5C:
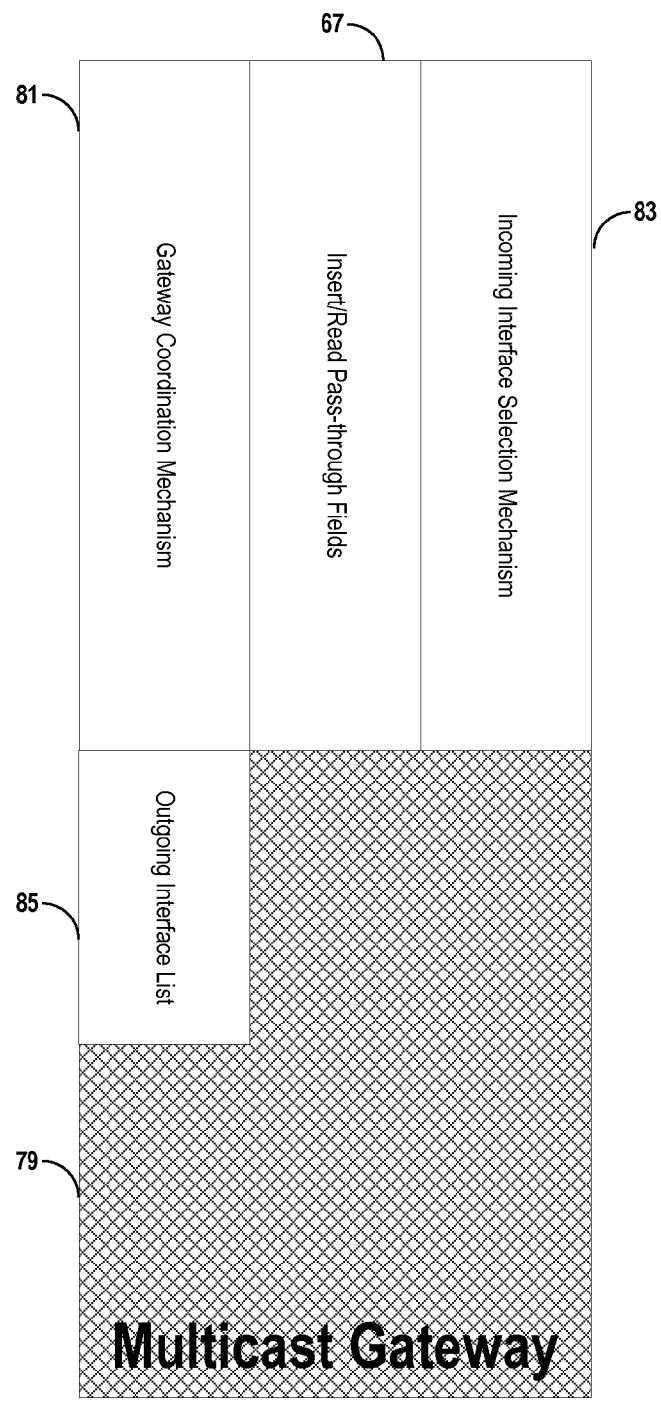

FIG. 5A-5C are block diagrams illustrating the routers (Red-side, Black-side, and multicast gateway) in greater detail. FIG. 5A particularly describes a Red-side router in greater detail. An original data packet 63A arrives at Red-side router 16 at Red-side port 65. Data packet 63A could be either an IPv4 data packet or an IPv6 data packet. Original data packet 63A is sent to port 67, which either populates one or more pass-through fields in the original data packet 63A to form a data packet with populated pass-through fields 63B or reads the already populated pass-through fields of data packet 63B. These fields can be populated in various ways according to the techniques of this disclosure depending on which function is being performed. This data packet with populated pass-through fields 63B is sent to INE-side Port 69 where it is further sent to an INE device for encryption. If the data packet indicates a source-specific join or prune operation, Red-side router 16 will process the operation and update SSM-Receiver Red-side Router list 71, as described above. Data packets can also be sent from Red-side port 65 to a trusted network.

FIG. 5B is a block diagram showing a Black-side router in greater detail. Encrypted data packet with populated pass-through fields 63C is sent to Black-side router 20 where it is received by INE-side port 73. The encrypted data packet with populated pass-through fields 63C is sent to port 67, which either populates one or more pass-through fields in the data packet 63C to form a new encrypted data packet with populated pass-through fields 63D or reads the already populated pass-through fields of data packet 63C. These fields can be populated in various ways according to the techniques of this disclosure depending on which proxy function is being performed. This encrypted data packet with populated pass-through fields 63D is then sent to Black-side port 75, where it can be further sent to an untrusted network. The information in the data packet 63C or 63D could also be used to update a receiver-HAIPE® list 77 at Black-side router 20, which contains subscription information and location information for various HAIPEs® that the associated red network is subscribing to. Data packets can also be sent from INE-side port 73 to an INE device.

FIG. 5C is a block diagram illustrating a multicast gateway in greater detail. Multicast gateway 79 has a port 67 that can insert information into and read already populated pass-through fields in a data packet, similarly to the Red-side router 16 and Black-side router 20 described above. Multicast gateway 79 also has gateway coordination mechanism 81, which maintains an outgoing interface list 85 and determines which outgoing interfaces will actually receive any multicast stream that is sent through multicast gateway 79, according to the techniques described above with regards to FIG. 4. Multicast gateway 79 also has an incoming interface selection mechanism 83 which will block duplicate multicast streams coming from multiple incoming interfaces, according to the techniques described above with regards to FIG. 4.

Figure 6:
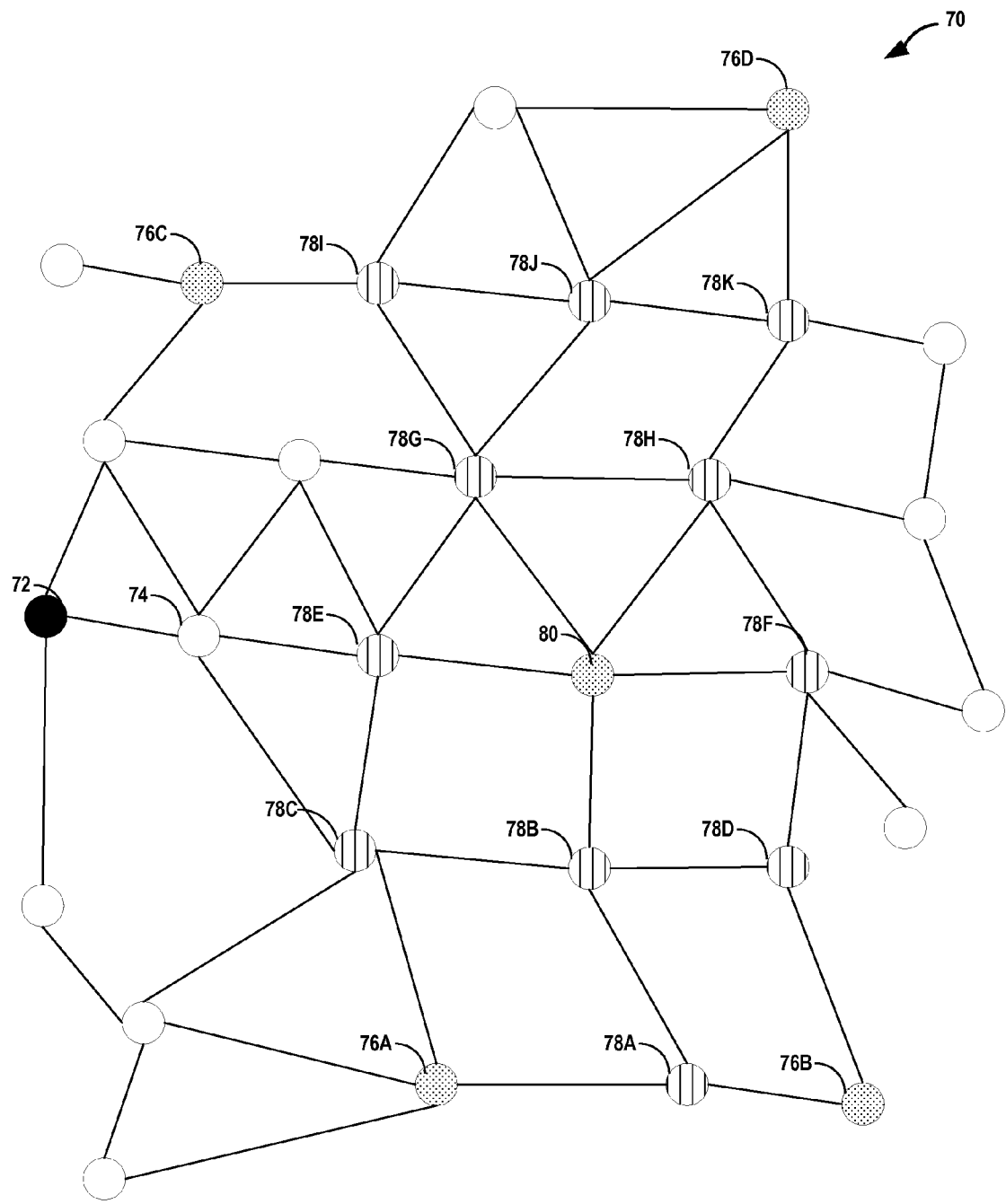
FIG. 6 is a block diagram illustrating an adaptive multicast routing mesh according to one example of the disclosure.

FIG. 6 is a block diagram illustrating an adaptive multicast routing mesh. The mesh-based routing broadcast method leverages the mesh establishment and maintenance in PUMA. In FIG. 6, a plurality of terminal nodes are interconnected in a MANET. All terminal nodes that are sender terminal nodes 72 are indicated by a solid black circle. All terminal nodes that are mesh member terminal nodes 78 are indicated by a circle with a vertical line pattern inside of it. All terminal nodes that are receiver terminal nodes 76 are indicated by a circle with a dotted pattern inside of it. All other terminal nodes 74 are indicated by solid white circles.

In establishing the mesh, all the receivers first consider themselves mesh members and set the mesh member flag to TRUE in the multicast announcements they send. Non-receivers consider themselves mesh members if they are in the shortest paths to the core from a mesh member. FIG. 6 shows an example of the formation of multicast mesh. Terminal node 76B is initially a mesh member, since it is a receiver. Terminal node 76B sets the mesh member flag to TRUE in its multicast announcements, which are subsequently received and processed by terminal nodes 78A and 78D. Terminal nodes 78A and 78D each compares the distance of terminal node 76B to the core 80 against its own distance from the core 80 and determines that it is in the shortest path from terminal node 76B to the core 80. Terminal nodes 78A and 78D then consider themselves mesh members and set the mesh member flag to TRUE in their announcements. Although terminal node 76B's other neighboring terminal nodes (not shown in FIG. 6) also receive terminal node 76B's announcements, they will not consider themselves mesh members or set the mesh member flag to TRUE in their announcements, since they are at equal distance to or further away from the core 80 than terminal node 76B. Multicast announcements from terminal node 78A and 78D will similarly be received and processed by terminal nodes 78B and 78F. The process continues until membership of the mesh is populated all the way to the core 80, which is always a mesh member.

Multicast data packets are forwarded along a shortest path towards the core 80. For instance, packets sent out by the sender terminal node 72 will be forwarded using unicast along the path sender terminal node 72-terminal node 74-terminal node 78E towards the core 80 until it reaches a mesh member. Each forwarding terminal node (in this case, 74 and 78E) checks to see whether it is a mesh member of the group. If the terminal node is not a mesh member (such as terminal node 74 in our example), it forwards the packets to its parent terminal node, i.e. the next terminal node in the shortest path to the core. If the terminal node is a mesh member (e.g. terminal node 78E), it will broadcast the packets received. Neighboring terminal nodes that are mesh members (e.g. terminal nodes 78G, 78C, and core 80) will also broadcast the packets received. Mesh members 78A-78G use a packet ID cache to detect and discard packet duplicates. As a result, multicast data packets are flooded only among the mesh members.

Mesh routing provides more reliable delivery of multicast data in a mobile network environment as it employs multiple redundant paths to deliver the packets to a receiver. For a mobile network environment with a relative stable topology, mesh routing may incur unnecessary bandwidth overhead as the same packet may be delivered multiple times to a receiver. In this case, tree-base routing offers more efficient delivery of multicast data packets.

FIG. 7 is a block diagram illustrating a near-optimal adaptive multicast tree. AIM-AN's near-optimal tree routing is built on the same multicast signaling protocol of the mesh routing to minimize the control overhead and to provide seamless switch between the two routing broadcast methods in the adaptive routing scheme. In FIG. 7, a plurality of terminal nodes are inter-connected in a MANET. All terminal nodes that are sender terminal nodes 72 are indicated by a solid black circle. All terminal nodes that are tree member terminal nodes 78 are indicated by a circle with a vertical line pattern inside of it. All terminal nodes that are receiver terminal nodes 76 are indicated by a circle with a dotted pattern inside of it. All other terminal nodes 74 are indicated by solid white circles. In the following example, the following fields are appended to the multicast announcement sent out by each receiver terminal node: The number of child receivers (number of receivers in the tree branch), child receiver ID (the ID of a receiver in the tree branch), and distance to the receiver (the distance to the receiver from the announcing terminal node).

The augmented multicast announcements are initially sent by all the receiver terminal nodes (e.g., 76A-76D) with the following data: Number of child receivers=1; Child receiver ID=its own ID; Distance to the receiver=1. The core 80 never sends receiver data in its announcements. Instead of forwarding multicast data packets through broadcast, each terminal node (including the core) creates and maintains a packet forwarding table and forwards the packets to the terminal node(s) downstream in the tree, which is rooted at the core 80.

The packet forwarding table includes a list of multicast groups (Group IDs) that have receivers in the network, and a list of multicast sources (Source IDs) for each group. For each (Group ID, Source ID) entry in the table, there is a list of Next Hop IDs indicating which neighboring terminal nodes to forward the packets to. The Source ID field is used for source-specific multicast (SSM) forwarding and will be described later in the section. For "any source" forwarding, a wild card is entered for Source ID in the table. A terminal node stores the receiver data from all the multicast announcements it receives from its neighbors in a connectivity list. It periodically updates the forwarding table with fresh announcements from its neighbors.

A terminal node processes receiver data according to a list of rules. First, a terminal node processes the receiver data from qualified neighbors only. A neighbor is qualified if the neighbor is further away from the core than the terminal node. A neighbor is not qualified if the neighbor is closer to or at an equal distance from the core. Second, a terminal node periodically goes through all the announcements from qualified neighbors and processes the receiver data starting from the neighbor with the highest number of receivers to the neighbor with the lowest number of receivers. For neighbors with the same number of receivers, it processes the freshest announcement first. Third, as a terminal node goes through the qualified announcements, it checks each receiver ID to see if it is in any previous announcement. If it finds the receiver in a previous announcement, it compares the distances to the receiver. The neighbor with a shorter distance will be considered a better next hop. The receiver will then be removed from the previous announcement. The announcement becomes updated. Fourth, for each receiver in an updated announcement, a terminal node increments the distance to the receiver by 1 and includes it in its multicast announcements. Fifth, a terminal node adds the first neighbor with a receiver to the Next Hop ID List. Sixth, a terminal node adds a neighbor to the Next Hop ID List if and only it contains a receiver not covered by any neighbors in the Next Hop ID List. Seventh, a terminal node removes other entries in the forwarding table for the group.

An example of how a near-optimal forwarding tree can be eventually created using these rules is illustrated in FIG. 7. Consider the tree branch from core 80 to receiver terminal nodes 76A and 76B. Initially, receiver terminal nodes 76A and 76B include in their multicast announcements: Number of child receivers: 1; Child receiver ID: 76A or 76B; Distance to the receiver: 1.

Since terminal nodes 74D and 78A have shorter distance to the core than 76B, and terminal nodes 74C and 78A have shorter distance to the core than 76A, they will have the following receiver data in their announcements. For terminal node 74D, the data will include: Number of child receivers: 1; Child receiver ID: 76B, Distance to the receiver: 2. For terminal node 78A, the data will include: Number of child receivers: 2; Child receiver ID: 76A, Distance to the receiver: 2; Child receiver ID: 76B, Distance to the receiver: 2. For terminal node 74C: Number of child receivers: 1; Child receiver ID: 76A, Distance to the receiver: 2.

Terminal nodes 74C and 74D will add receiver terminal nodes 76A and 76B to the Next Hop ID List in their respective forwarding tables, while terminal node 78A will add both receiver terminal nodes 76A and 76B to the Next Hop ID List in its forwarding table.

Similarly, terminal nodes 74B, 78B and 74E will have the following entries in their announcements, while other terminal nodes (e.g. terminal node 74A) will have no receiver data in their announcements since they have an equal or longer distance from the core than the announcing neighbors. For terminal node 74E, the data will include: Number of child receivers: 1; Child receiver ID: 76B, Distance to the receiver: 3. For terminal node 78B, the data will include: Number of child receivers: 2; Child receiver ID: 76B, Distance to the receiver: 3; Child receiver ID: 76A, Distance to the receiver: 3. For terminal node 74B, the data will include: Number of child receivers: 1; Child receiver ID: 76A, Distance to the receiver: 3.

Since terminal node 78A has two receivers within the shortest distances, terminal node 78B will add terminal node 78A to its Next Hop ID List. Terminal nodes 74C and 74D both have receivers covered by 78A and therefore will not be considered as the next hop by terminal node 78B. This tree construction process continues until it reaches the core 80, where core terminal node 80 will consider terminal node 78B as the best next hop to forward the multicast packets. Although terminal nodes 74B and 74E will set terminal nodes 74C and 74D as their respective next hop, data flow will follow an optimal route of core terminal node 80-terminal node 78B-terminal node 78A->receiver terminal nodes 76A and 76B, as core terminal node 80 will only forward packets to terminal node 78B and terminal node 78B only forwards packets to terminal node 76B.

Packet forwarding in the tree delivery structure is a structured process. First, when a terminal node receives a multicast data packet, it first determines whether it is a tree member by checking whether it has a tree forwarding table. If the terminal node is not a tree member, it forwards the packet to its parent. If the terminal node is a tree member, it checks the sender of the packet. If the packet is from a terminal node other than its parent or child, it forwards the packet to its parent. If the packet is from its parent, the terminal node forwards the packet down the tree to each of its child (next-hop) terminal nodes in its forwarding table. If the packet is from a child terminal node, it forwards the packet to other child terminal nodes in the forwarding table as well as to its parent. A terminal node sends a pruning message to a terminal node that forwards a duplicate packet, i.e. a packet that has been received before (from another terminal node). When a terminal node receives a pruning message from another terminal node, it stops forwarding packets to that terminal node.

By following these forwarding rules, it is ensured that packets from a sender on their way to the core will be delivered along the shortest route to the receivers as soon as they hit a tree member. For instance, if receiver terminal node 76A (see FIG. 7) is also a sender, packets may follow the route terminal node 76A-terminal node 78A-terminal node 78B->core terminal node 80 towards the core 80. As soon as they reach terminal node 78A, the packets will be forwarded to receiver terminal node 76B. Terminal node 78A will also forward the packets to terminal node 78B so that they can reach core terminal node 80, which will forward them to other receivers (terminal nodes 76C and 76D) along the tree. The pruning mechanism enables the tree to be further optimized in case there is still a redundant path in the near-optimal tree structure.

To facilitate dynamic routing change, a new field can be added in the multicast announcements, routing mode, to indicate which routing broadcast method should be used by the terminal nodes. An announcement indicating a new routing mode will be initiated by the core according to certain criteria. Subsequent announcements by other terminal nodes will contain the same routing mode. Therefore routing mode change will always propagate from the core, in the general direction of the data flows. At any given time, a terminal node will enforce one of three routing broadcast methods: Tree Routing (tree members forward data packets according to the forwarding table), Mesh Routing (mesh members forward data packets), or Network Flooding (all terminal nodes forward data packets). Since unified signaling protocol is used, both mesh and tree routing structures are established simultaneously with the multicast announcements and switching between these two routing broadcast methods as well as with the flooding mechanism should be seamless.

The routing mode can be configured by the network administrator according to their knowledge of the network in which the system will be deployed. Without pre-configuration, the core will initially set the routing mode to Tree Routing in the multicast announcements. The core terminal node keeps track of how many receiver terminal nodes and sender terminal nodes are currently in a group and its downstream terminal nodes. A receiver terminal node initiates a core-change request when it misses a few multicast announcements, which may indicate higher mobility in the network. The core will then try to repair the network by immediately issuing a new multicast announcement. If the core receives repeated core-change requests, it indicates that the mobility may be too high for the network to repair itself. It will then switch the routing mode to Mesh Routing. If the core continues to receive core-change requests, it will switch to Network Flooding. After a while, the core will attempt to switch back to Mesh or Tree Routing, depending on group size and downstream terminal nodes.

The source-specific multicast (SSM) protocol allows multicast receivers to indicate which senders they should receive multicast data from. SSM routing allows multicast delivery structures to be pruned so that multicast data will not be sent to branches where there are no interested receivers. A simple scheme to add support for SSM routing in the tree routing broadcast method is described below.

In the receiver data in multicast announcements, source addresses are added to each of the receivers in the announcement, so that the multicast announcement will look like this: Number of child receivers (number of receivers in the tree branch), child receiver ID (the ID of a receiver in the tree branch), the distance to the receiver (the distance to the receiver from the announcing terminal node), number of sources (number of senders this receiver is interested in receiving data from), and source ID (the ID of a sender). The processing of the multicast announcements will remain basically the same, except that the Source ID field in the forwarding table may be populated with the source addresses indicated by the receiver. If a receiver does not indicate a resource (i.e. number of source is 0), it is considered to be interested in receiving data from all senders in the group and the Source ID in the table can simply be left blank. For packet forwarding, a terminal node checks both Group ID and Source ID to determine the next hops to forward the packets.

The mesh routing broadcast method can also be extended to support SSM. In this case, a new table may be needed to indicate source-specific mesh membership of a terminal node. A source-specific mesh is essentially a sub-mesh within the original mesh. The main reason we use mesh routing is the advantage of using redundant paths to deliver the packets to a receiver. A source-specific mesh will reduce this redundancy. This will be beneficial in the case where all the receivers in a certain area specify the same sources to receive data from.

FIG. 8A-8D are tables showing the construction and bit locations of various data packets sent via router signaling in an adaptive and integrated multicast for the airborne networks. FIG. 8A is a diagram with a table showing the bit addresses of different items in a data packet sent over the INEs. Specifically, the table shows one example of a data packet that could be used in accordance with the techniques of this disclosure. One type of data packet that could be sent is a Start of Sequence (SoS) packet 84. SoS packet 84 is an IPv6 packet in FIG. 8A. SoS packet 84 has three pass-through fields, which are fields that will remain unencrypted when passing through an INE. For example, these pass-through fields are the traffic class field, located at bits 4-11, the flow label field, located at bits 12-31, and the hop limit field, located at bits 56-63. Note that, for a SoS packet 84, the hop limit field is equal to the number of data frames in the sequence plus two.

FIG. 8B is a diagram with a table showing the bit addresses of different items in a second data packet sent over the INEs. Specifically, the table shows one example of a data packet that could be used in accordance with the techniques of this disclosure. One type of data packet that could be sent is an End of Sequence (EoS) packet 86. EoS packet 86 is an IPv6 packet in FIG. 8B. EoS packet 86 has three pass-through fields, which are fields that will remain unencrypted when passing through an INE. For example, these pass-through fields are the traffic class field, located at bits 4-11, the flow label field, located at bits 12-31, and the hop limit field, located at bits 56-63. Note that, for an EoS packet 86, the hop limit field is always equal to 2.

FIG. 8C is an example of an IPv4 data packet. The pass-through fields of IPv4 data packet 88 are located at bit 8-13, 14-15, and 64-67. The Differentiated Services Code Point (DSCP) field is located at bits 8-13. The Explicit Congestion Notification (ECN) field is located at bits 14-15. The Time To Live (TTL) field is located at bits 64-67. These three pass-through fields are not encrypted when passing through certain INEs, such as a HAIPE® device in bypass mode.

FIG. 8D is an example of an IPv6 data packet. The pass-through fields of IPv6 data packet are located at bits 4-11, 12-31, and 56-63. The traffic class field is located at bits 4-11. The flow label field is located at bits 12-31. The hop limit field is located at bits 56-63. These three pass-through fields are not encrypted when passing through certain INEs, such as a HAIPE® device in bypass mode.

FIG. 8A is the IPv6 packet header for the Start of Signal (SOS) packets. Signaling packets have no payload data. The SOS uses the 8-bits of the Traffic Class field as a "signal-code". The value 0 is reserved for use in an End of Signal (EOS) packet (described below), allowing for 255 different unique signal-codes.) The 20-bits of the Flow Label may optionally include a data field specific to a particular signal-code.

The 8-bit Hop Limit field is set with the total number of data packets (intermediate packets in the signaling sequence sandwiched between SOS and EOS). For a signaling sequence which consists of no data packet the Hop Limit is set to 2 on the Red-side router and arrives at the Black-side router with a value of 0. For a signaling sequence consisting of n packets (n>0) the Red-side router sets the Hop Limit field in the SOS with the value of n+2, and this value arrives at the Black-side router as n, indicating that the sequence will contain n consecutive data packets. Note that the data packets may or may not be addressed to the RBMC address and may be either IPv4 or IPv6 packets (depending upon the particular signal-code).

One example method of this disclosure involves a first proxy adapter signaling a data packet including one or more pass-through fields. The first proxy adapter then sends the data packet to an INE. A second proxy adapter receives the data packet from the INE. The second proxy adapter reads the pass-through fields. A performance enhancing proxy function is then performed using information in the one or more pass-through fields.

Figure 9:
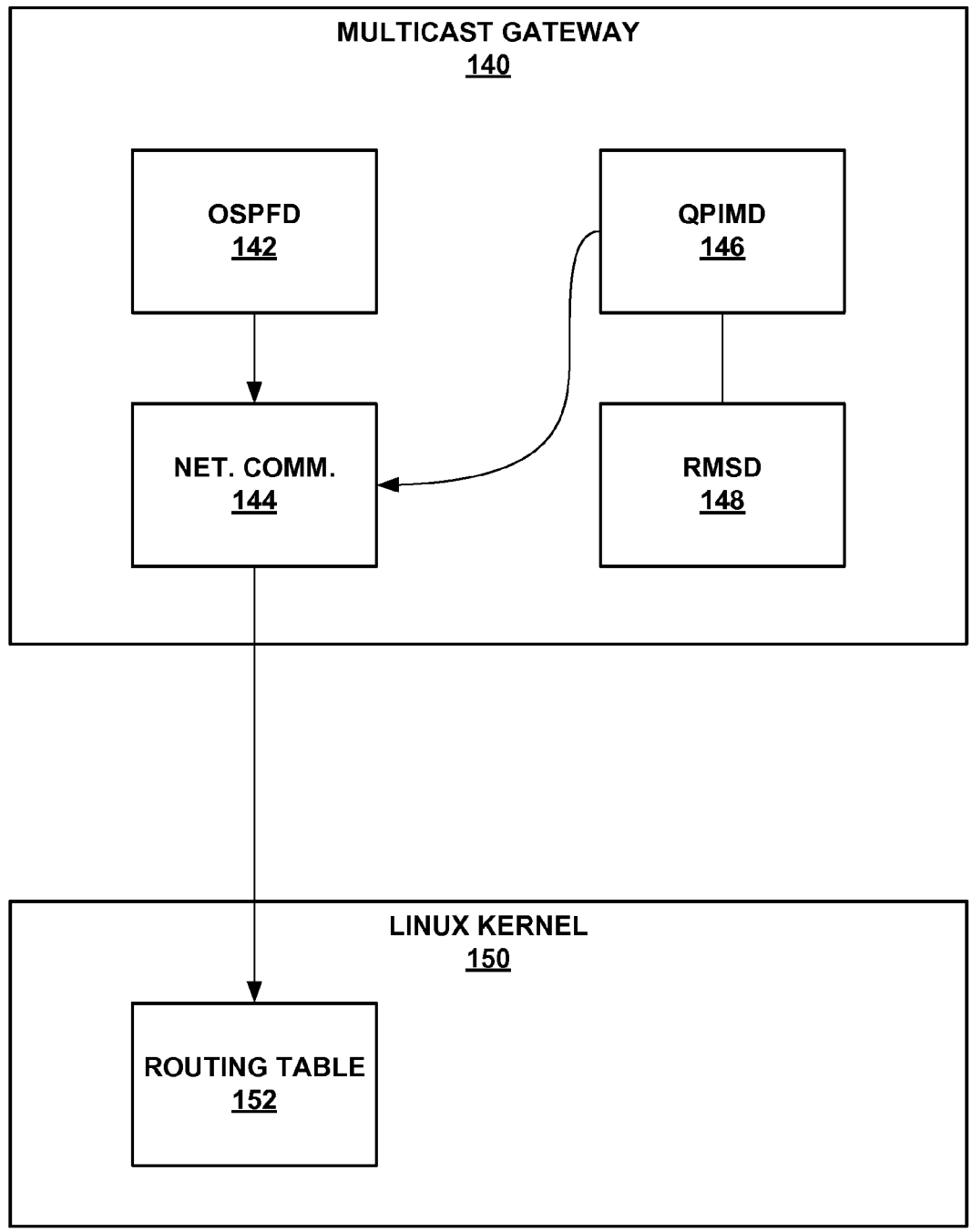
FIG. 9 is a block diagram illustrating a modified multicast gateway that implements resilient multicast source discovery according to one example of the disclosure.

FIG. 9 is a block diagram illustrating a modified multicast gateway that implements resilient multicast source discovery according to one example of the disclosure. Multicast gateways interconnect diverse radio subnets for network-wide multicast operations. In some example networks, gateway routers (TRs) run a network routing software that provides implementations of open shortest path first (OSPF), routing information protocol (RIP), border gateway protocol (BGP), and intermediate system to intermediate system (IS-IS), such as Quagga, which includes a Quagga PIM daemon 146 (QPIMD). QPIMD 146 is only capable of PIM-SSM. However, in some circumstance, there may be a need for an enhanced multicast service so that multicast receivers can subscribe to a group without prior knowledge of the multicast senders. In a highly mobile network environment, a simple PIM-SM implementation could not be sufficient due to node mobility, as PIM-SM requires a fixed rendezvous point (RP).

Multicast gateway 140 is configured to account for the complex scenarios in which multicast MANETs can be interconnected with each other and with the GIG. To interoperate with the current network configuration, multicast gateway 140 has been configured to include a Resilient Multicast Source Discovery 148 (RMSD) unit configured to implement fault-tolerant multicast operations in highly mobile environments. The modified multicast gateway 140 leverages the existing routing capabilities in Quagga, such as an open shortest path first daemon 142 (OSPFD) and PIM-SSM, and operates as a module. Multicast gateway 140 also contains a network communication module 144 which communicates with Linux kernel 150 to access routing table 152. Routing table 152 may be a data table stored in the multicast gateway that lists the routes to a particular network destination, metrics associated with those routes, and information about the topology of the network immediately around it.

Figure 10:
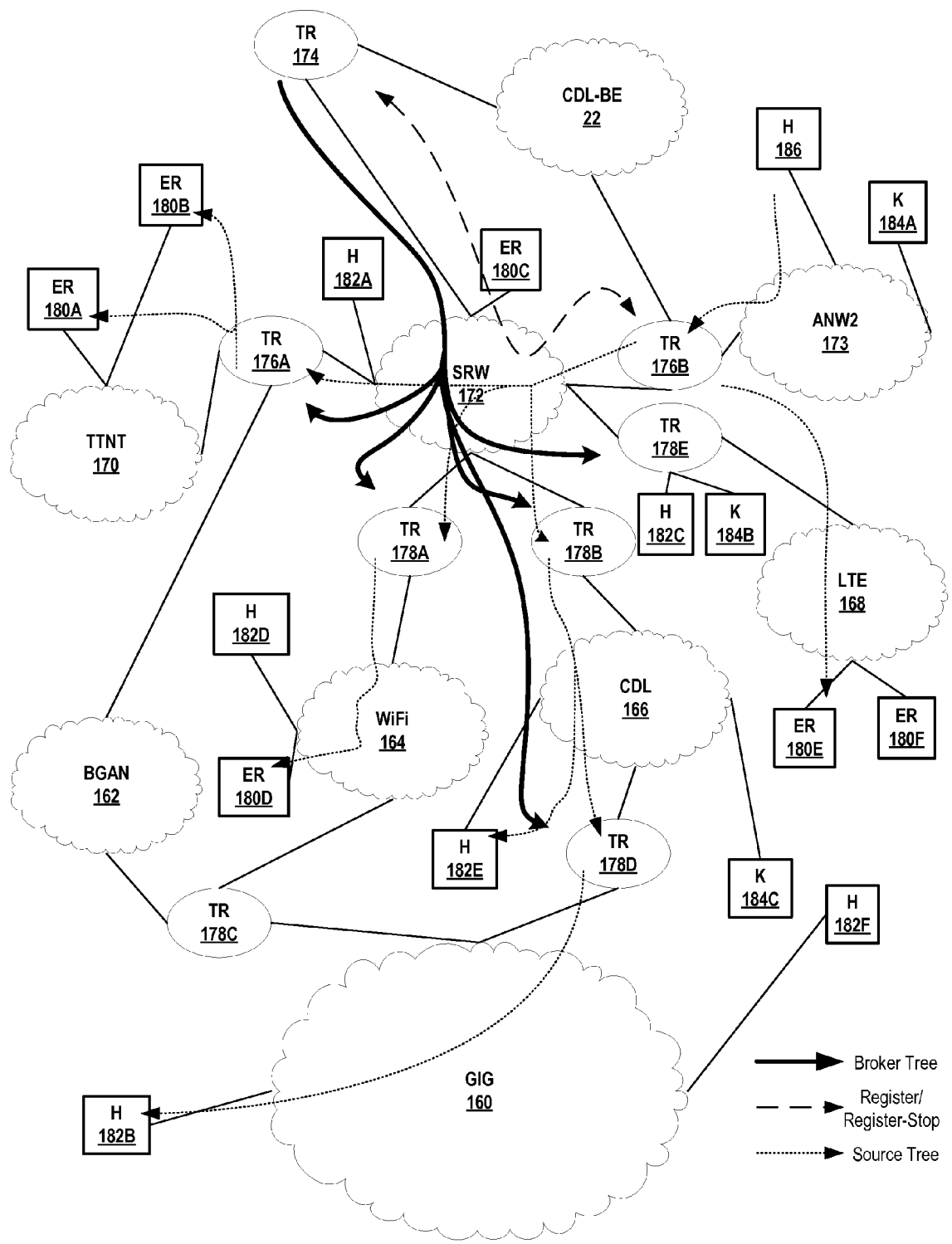
FIG. 10 is a block diagram illustrating an adaptive and integrated multicast network featuring resilient multicast source discovery according to one example of the disclosure.

FIG. 10 is a block diagram illustrating an adaptive and integrated multicast network featuring resilient multicast source discovery according to one example of the disclosure. Resilient multicast source discovery (RMSD) is deployed in multicast gateway routers, providing network-wide Any-Source Multicast (ASM) services. RMSD is implemented to enable fault-tolerant ASM across the radio subnets. The PIM-SM-like fault-tolerant multicast service involves four phases: 1) Dynamic RMSD broker election; 2) Multicast sender registration; 3) Multicast sender notification; and 4) Shortest-path multicast data delivery.

In FIG. 10, a number of gateway routers (structured similar to those described above with respect to FIG. 9) 174, 176A-176B, and 178A-178E interconnect networks and enclaves 160-173. A number of gateway routers (174, 176A, 176B) in the multicast network will be configured as a candidate RMSD broker. The primary RMSD broker (RB) is dynamically elected by all candidate RMSD brokers. If the primary RB 174 is unable to perform as the RB (e.g. it has moved away from the region), a secondary RB will be elected to serve as the RB for the network.

In the RB election process, candidate RBs 174 and 176A-176B may periodically flood gateway routers 174, 176A-176B, and 178A-178E with candidate-RB-advertisement messages, which may include a priority index. In a flood operation, every message is sent through every outgoing link except the one it arrived on, meaning the message is circulated to every other gateway router in the overall network. The primary RB 174 may be determined by all gateway routers 174, 176A-176B, and 178A-178E independently based on the priority index, or by the highest IP address if they have the same priority index. Candidate RBs 176A-176B with lower priority index (or lower IP addresses if the priority indices are equal) suppress candidate-RB-advertisement messages. Each candidate RB 176A and 176B monitors candidate-RB-advertisement messages received and resend its own candidate-RB-advertisement message if it is missing a candidate-RB-advertisement messages with higher priority index or IP address. All gateway routers 174, 176A-176B, and 178A-178E recalculate independently with the most recent candidate-RB-advertisement messages to determine the primary RB.

A simplified version of the dynamic RB election relies on a capability of dynamic discovery of network topology, such as that provided by OSPF. In this case, all gateway routers 174, 176A-176B, and 178A-178E become candidate RBs and no candidate-RB-advertisement messages will be sent by any routers in the network. The router with the highest (or lowest) IP address in the network will be dynamically elected as the current RB. Since all routers have the same network topology due to the network discovery protocol, each router can independently determine which router is the primary RB.

Since, in some examples, all multicast gateways 174, 176A-176B, and 178A-178E may have the knowledge of the primary RB in the network including the sender router 186, the multicast gateway router (e.g., multicast gateway 176B) sends Source-Register messages to RB 174 periodically to notify the existence of the sender router (e.g. sender router 186).

In FIG. 10, the receiver gateway routers can be dynamically notified of the sender router by the existence of a broker tree. Since all multicast gateways 174, 176A-176B, and 178A-178E have the knowledge of the primary RB 174 in the network, the receiver gateway routers 176A-176B, and 178A-178E follow four steps to receive notification of senders. Receiver gateway routers 176A-176B, and 178A-178E join the broker tree (RB, G) using PIM-SSM. RB 174 may aggregate all senders for a group and send a sender-inform message along the broker tree periodically. If no downstream routers exist in the broker tree, RB 174 sends a register-stop message to the sender gateway router 176B. Sender gateway router 176B stops sending source-register messages upon receiving the register-stop message and sets a re-registration timer.

Since a source-rooted delivery tree (Source Tree) provides an efficient way of delivering multicast data, multicast data delivery among the multicast gateways 174, 176A-176B, and 178A-178E in the network will use Source Tree. As soon as a receiver gateway router 176A-176B, and 178A-178E receives notification of a new multicast sender, receiver gateway router 176A-176B, and 178A-178E may join a Source Tree for shortest path data delivery using PIM-SSM. Multicast joins and prunes are sent using unicast to the next multicast gateway in the Source Tree, with corresponding actions on the multicast group in radio networks. The sender router 186 sends data packets along the source tree. This approach may result in more bandwidth efficiency and higher scalability than PIM-SM, since the primary RB 174 does not participate in data forwarding, unlike in PIM-SM. This may eliminate the need for packet encapsulation and duplicate packet delivery for multicast data.

A multicast mobility service may be further deployed in multicast gateway routers, providing multicast services for users with mobile IP addresses. This capability may facilitate node mobility in multicast. This technique is deployed in multicast gateway routers, providing multicast services for users with mobile IP addresses. In one example, a sender gateway router 176B obtains a mapping between the regular IP address and the mobile IP address of sender router 186 from a mobility registry service in the network, upon receiving a multicast data packet from a mobile multicast sender 186. The regular IP address may be the IP address of a router, whereas the mobile IP address may be the IP address of the device. A multicast gateway router (e.g., multicast gateway 176B) includes the mapping in a Source-Register message sent to the Dynamic RB 174. On the receiver side, the receiver router 180A-180F converts the IP address in the data packets from the regular IP address to the mobile IP address, using the mapping information obtained from the Sender-Inform message.

In addition, when a multicast subscriber, such as any of receiver routers 180A-180F, is interested in receiving multicast data from a multicast sender (e.g., multicast sender 186) using its mobile IP address, it will send source-specific Internet Group Management Protocol (IGMP) reports to the subnet, with the mobile IP address as the source. Upon receiving a source-specific IGMP report from the receiver router 180A-180F, the receiver gateway routers 176A-176B, and 178A-178E will check to see if the source is a mobile IP address. If so, the receiver gateway router 176A-176B, and 178A-178E converts it into a source-specific IGMP report with the corresponding regular IP address as the source. The receiver gateway router 176A-176B, and 178A-178E obtains a mapping between the regular IP address and its mobile IP address from a mobility registry in the network. Alternatively, the receiver gateway router 176A-176B, and 178A-178E can register with RB 174 and obtain the mapping through Sender-Inform messages received from the RB 174, as soon as the sender router 186 starts to send multicast data.

In one example method of this disclosure, one or more routers (e.g., multicast gateways 174, 176A, and 176B) periodically flood the one or more multicast gateways (e.g., multicast gateways 174, 176A-176B, and 178A-178E) with one or more candidate advertisements, wherein each candidate advertisement includes a priority index. Each multicast gateway determines a resilient multicast source broker (e.g., broker 174) based on the priority index when a new candidate advertisement is received. A sender gateway router (e.g., sender gateway router 176B) periodically sends a source-register message to the resilient multicast source broker. A receiver gateway router (e.g., receiver gateway router 176A-176B, and 178A-178E) joins a broker tree at the resilient multicast source broker. The resilient multicast source broker periodically sends a sender-inform message along the broker tree. If the broker tree is empty, the resilient multicast source broker sends a register-stop message to the sender gateway router. The receiver gateway router sends a request to join a source tree towards the sender router via the one or more multicast gateways. The sender router sends data packets along the source tree.

In some examples, responsive to receiving a multicast data packet from a sender terminal node, the sender gateway router obtains a mapping between a regular IP address of the sender router and a mobile IP address of the sender router. One of the multicast gateways sends a source-register message to the resilient multicast source broker, wherein the source-register message includes the mapping. The sender gateway router sends a sender-inform message to the receiver router, wherein the sender-inform message includes the mapping. The receiver gateway router converts a regular IP address of a data packet to a mobile IP address using the mapping. In some examples, the receiver router further sends a source-specific report to a subnet, wherein a source in the source-specific report is the mobile IP address of the sender router. Responsive to verifying that the source is a mobile IP address, the receiver gateway router converts the mobile IP address in the source-specific report to a regular IP address. The receiver gateway router replaces the mobile IP address in the source-specific report with the regular IP address.

Figure 11:
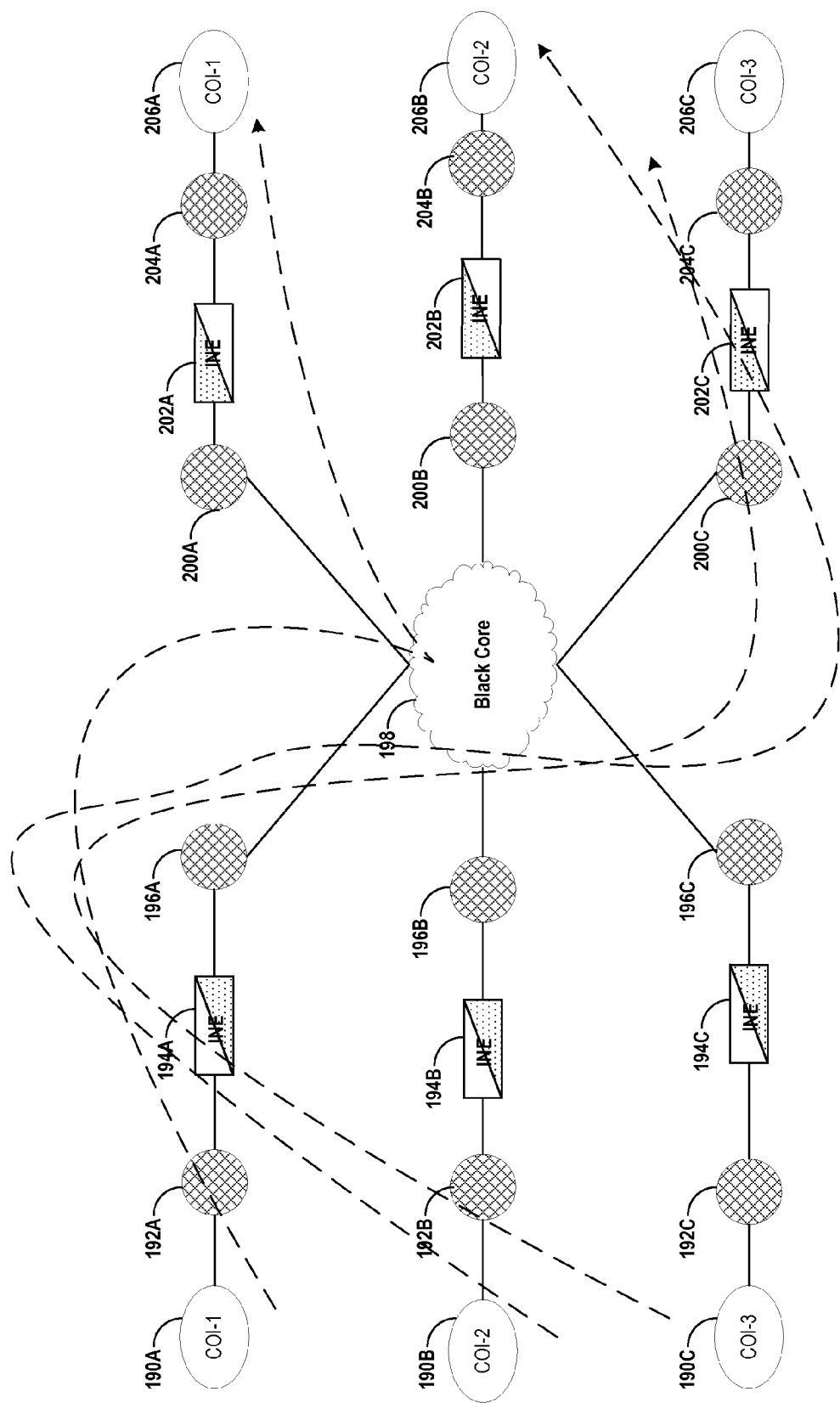
FIG. 11 is a block diagram illustrating an automatic multicast address de-confliction according to one example of the disclosure.

FIG. 11 is a block diagram illustrating an automatic multicast address de-confliction according to one example of the disclosure. This technique may be deployed in multicast gateway routers, providing multicast services for different Communities of Interest (COIs) using conflicting multicast addresses. Without proper coordination across different organizations, multiple COIs can communicate using same multicast address in the black network. This multicast address conflict most often occurs when COIs within the red enclaves are using the same multicast address in the red network and the HAIPE devices map the red address to the same address in the black network. In the example shown in FIG. 11, where COI users in the left-side enclaves are supposed to stream multicast data to their corresponding COI users in the right-side enclaves, but each user has the same address. In this case, all three streams of multicast traffic will reach each of the black routers on the right side, as they subscribe to multicast group M in the black network. This can cause bandwidth inefficiency in tactical MANET, and clog low-bandwidth links with unwanted traffic.

In the example of FIG. 11, Automatic Multicast Address De-confliction uses COI tagging in the multicast source discovery process to resolve address conflicts. Each black router 196A-196C and 200A-200C (or inline network encryptor 194A-194C and 202A-204C in case of a router-integrated inline network encryptor) attaches a COI name to the black address (i.e. the sender address in the black network 198 in RMSD) enclave. For instance, COI name for 190A and 206A may be "COI-1", COI name for 190B and 206B may be "COI-2", and COI name for 190C and 206C may be "COI-3". When the receiver routers 200A-200C receive the sender information, receiver routers 200A-200C check the name of the COI 190A-190C for each sender router 196A-196C of a multicast group to determine if the sender enclave belongs to the same COI 206A-206C fronted by the receiver router 200A-200C. In the example of FIG. 11, COI name for 206A is "COI-1", COI name for 206B is "COI-2", and COI name for 206C is "COI-3", although each COI name could be any of a variety of COI names. Receiver routers 200A-200C may have their respective enclave's COI name stored in the router itself, and each router 200A-200C may check an incoming stream's COI name and compare it against the COI name stored in the router. A receiver router 200A-200C only subscribes to a multicast traffic (using PIM-SSM) from a sender router 196A-196C belonging to the same COI 190A-190C. In one example, sender routers 196A-196C are configured with a COI name tag for 190A-190C through a configuration file.

In one example method of this disclosure, one or more sender routers (e.g., sender routers 196A-196C) in an untrusted network attach a community of interest name (e.g., COI 190A-190C) to the router's respective enclave. Responsive to receiving sender information, a receiver router (e.g., receiver routers 200A-200C) checks the community of interest name for each sender router of a multicast group. The receiver router determines whether the enclave containing the sender router has the same community of interest name as the enclave containing the receiver router (e.g., COI 206A-206B). Responsive to determining that the enclave containing the sender router has the same community of interest name as the enclave containing the receiver router, the receiver router subscribes to a multicast stream. In some examples, the sender routers are configured with a community of interest name through a configuration file.

Figure 12:
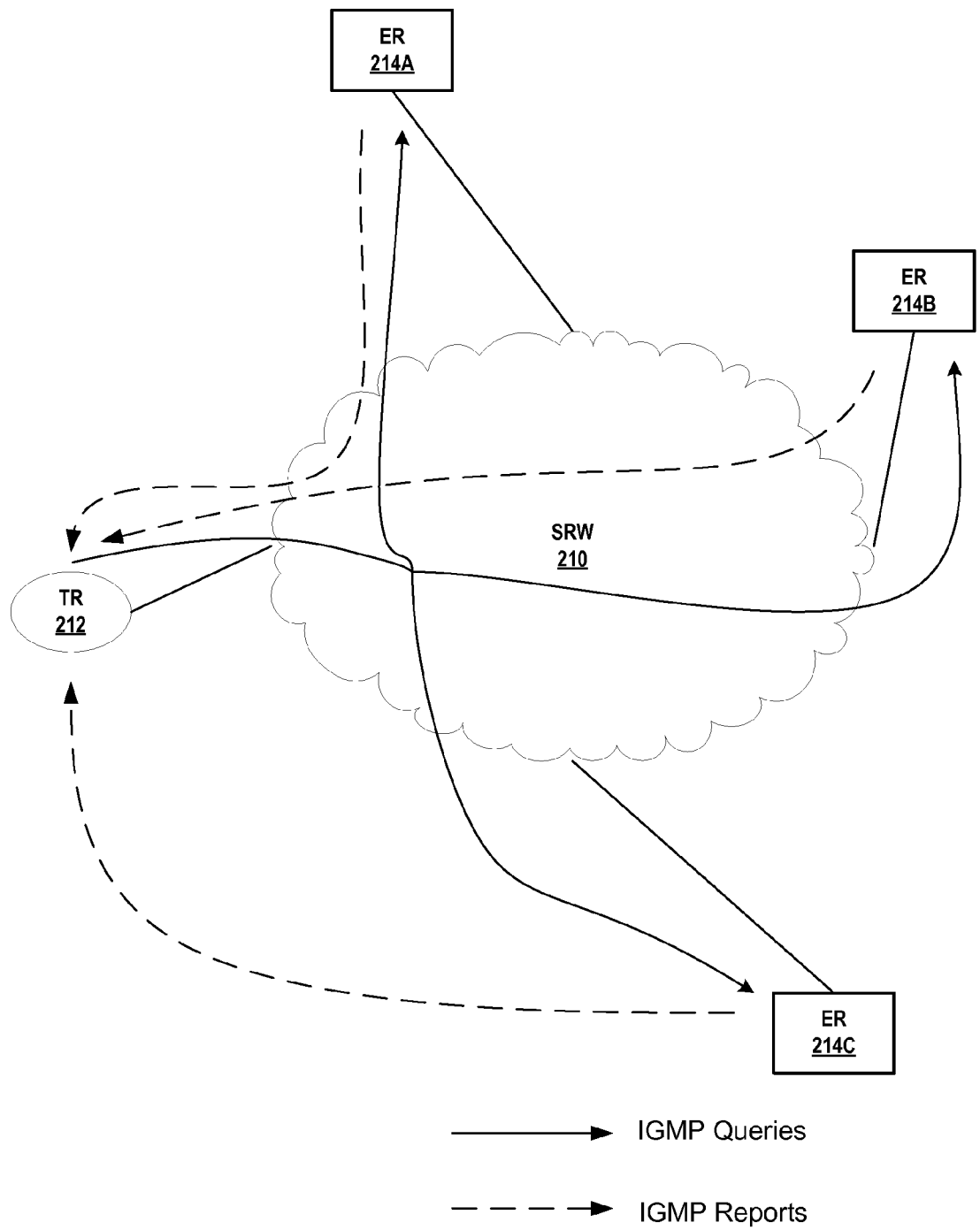
FIG. 12 is a block diagram illustrating internet group management protocol tunneling for a broadcast-capable network according to one example of the disclosure.

FIG. 12 is a block diagram illustrating internet group management protocol (IGMP) tunneling for a broadcast-capable network according to one example of the disclosure. This technique is deployed in multicast gateway routers and multicast hosts, providing subnet multicast services for non-compatible radio subnets. IGMP Tunneling provides multicast capability needed for the gateway routers and hosts to discover one another in radio subnets that do not provide multicast support. A generic approach is disclosed to provide IGMP capability for non-compatible radio subnets. IGMP tunneling is implemented utilizing iptables and minimal encapsulation. In one example, Iptables is a user space application program that allows a system administrator to configure the tables provided by a kernel firewall (e.g., in Linux) and the chains and rules it stores. A key advantage of this approach is that it may work for both broadcast-capable and non-broadcast radio networks, without any change to radio software.

The generic approach for IGMP tunneling includes processes for Designated Router (DR) election, IGMP Query forwarding and IGMP Report forwarding. In the DR election process, the method chosen to elect the DR depends on the characteristics of the subnet and how gateway routers discover one another within the subnet. If the subnet has a default gateway preconfigured, the default gateway may act as the DR. If the gateway routers of a subnet discover one another through a unicast routing protocol (e.g., OSPF), a computing device in the subnet may sort the IP addresses of each gateway router and elect a gateway router as the DR based on the results of that sort. If none of the above is true, the gateway routers may use first-in-first-out registration messages (e.g., PIM Hello messages) to discover one another. Each gateway router in the subnet may then sort the IP addresses of each gateway router and elect a gateway router as the DR based on the results of that sort. The first-in-first-out registration messages may be sent through broadcast in a broadcast-capable radio subnet or through an emulated all-routers multicast group for a non-broadcast subnet.

The DR is responsible for sending IGMP queries and processing IGMP reports. Generally, IGMP queries are sent by DR through broadcast in broadcast-capable radio subnets, and IGMP reports are tunneled to the DR. For non-broadcast subnets, multicast emulation is used to send IGMP queries. In this case, all hosts will join emulated all-systems group. IGMP queries are sent by DR through emulated all-systems multicast group with IGMP reports tunneled to the DR.

Figure 13:
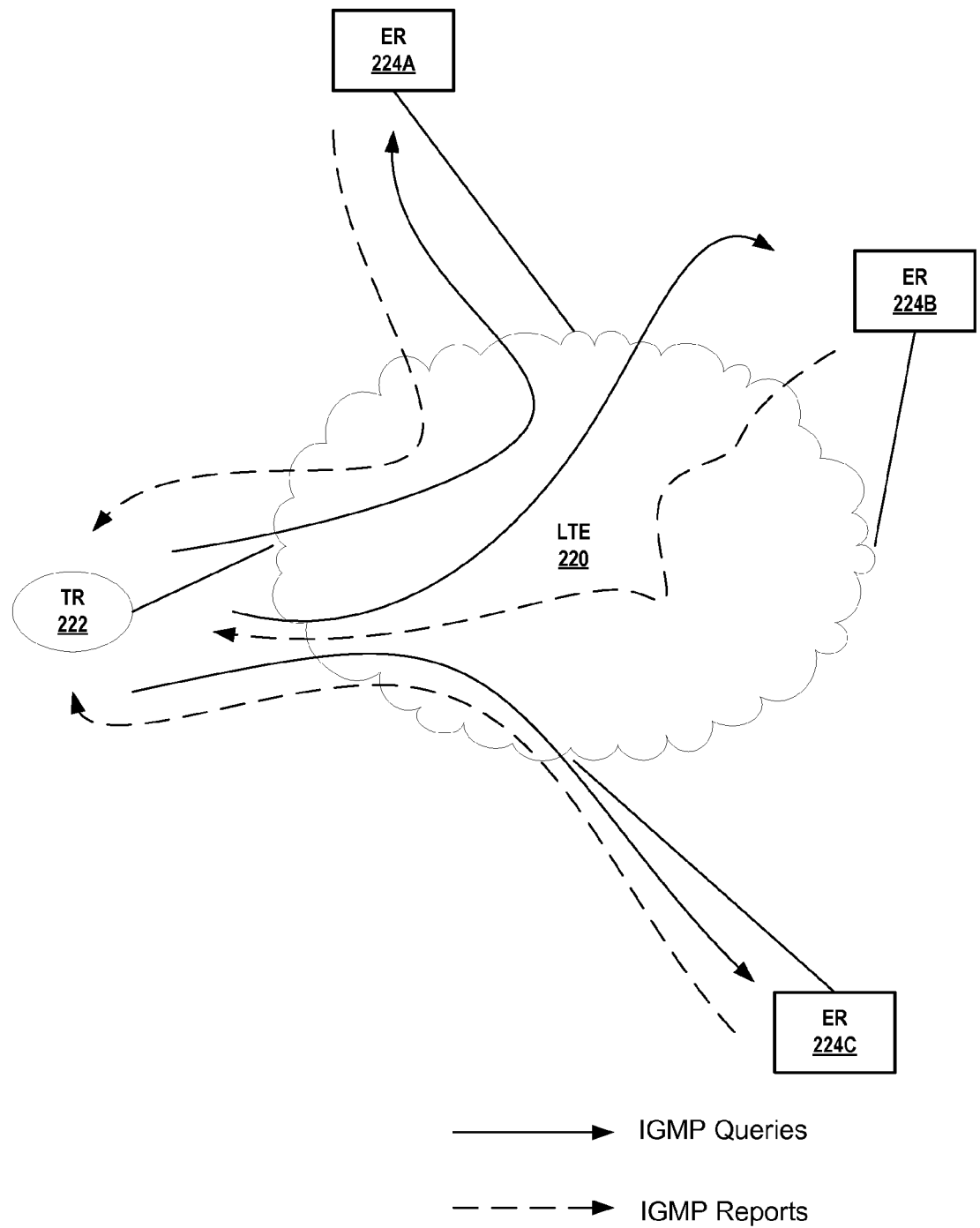
FIG. 13 is a block diagram illustrating internet group management protocol tunneling for a non-broadcast multiple access network according to one example of the disclosure.

FIGS. 12 and 13 provide two examples to illustrate how IGMP tunneling can be integrated with the multicast gateways routers and receiver routers for a broadcast-capable network and a non-broadcast network, respectively. In both cases, receiver routers 214A-214C will be an IGMP host, while multicast gateway 212 will be the Designated Router (DR) for the subnet. In the example of FIG. 12, SRW network 210, which provides a broadcast capability, IGMP queries will be broadcast to SRW network 210 and receiver routers 214A-214C, while IGMP reports will be tunneled by the receiver routers 214A-214C and SRW network 210 to the DR 212.

FIG. 13 is a block diagram illustrating internet group management protocol tunneling for a non-broadcast multiple access network according to one example of the disclosure. In the LTE network 220, which does not provide native support for broadcast or multicast, an initial implementation of multicast emulation may be present in the receiver routers 224A-224C. In this case, IGMP queries will be sent by the DR 222 through emulated multicast (to the all-systems multicast group) to LTE network 220 and receiver routers 224A-224C, while IGMP reports will be tunneled by the receiver routers 224A-224C and LTE network 220 to the DR 222.

One example method of this disclosure relates to internet group management protocol tunneling. In this method, each of a plurality of multicast gateways elects a designated router (e.g., DR 212) in a subnet (e.g., SRW network 210). The designated router sends internet group management protocol queries to at least one router in the subnet (e.g., routers 214A-214C). Internet group management protocol reports are tunneled to the designated router. In some examples, the subnet has a preconfigured default gateway, and electing the designated router comprises electing a default gateway router as the designated router. In other examples, each of the plurality of multicast gateways discover one another through a unicast routing protocol, and electing the designated router comprises electing a highest-addressed gateway router as the designated router.

In still other examples, the subnet is a broadcast-capable radio subnet (e.g., SRW network 210), and sending the internet group management protocol queries comprises sending the internet group management protocol queries via a broadcast. In these examples, first-in-first-out registration messages are broadcast amongst each of the plurality of multicast gateways in the subnet. Each of the plurality of multicast gateways sorts the plurality of multicast gateways according to IP addresses. Each of the plurality of multicast gateways elects a gateway router as the designated router based on the sorted IP addresses.

One example method of this disclosure relates to internet group management protocol tunneling. In this method, each of a plurality of multicast gateways elects a designated router (e.g., DR 222) in a subnet (e.g., LTE network 220). The designated router sends internet group management protocol queries to at least one router in the subnet (e.g., routers 224A-224C). Internet group management protocol reports are tunneled to the designated router. In some examples, the subnet has a preconfigured default gateway, and electing the designated router comprises electing a default gateway router as the designated router. In other examples, each of the plurality of multicast gateways discover one another through a unicast routing protocol, and electing the designated router comprises electing a highest-addressed gateway router as the designated router.

In some examples, the subnet is a non-broadcast subnet (e.g., LTE network 220), and wherein sending the internet group management protocol queries comprises sending the internet group management protocol queries via multicast emulation. In these examples, first-in-first-out registration messages are sent in the subnet via an emulated all-routers multicast group. Each of the plurality of multicast gateways sorts the plurality of multicast gateways according to IP addresses. Each of the plurality of multicast gateways elect a gateway router as the designated router based on the sorted IP addresses. In some examples, the non-broadcast subnet is a long-term evolution (LTE) network.

Figure 14:
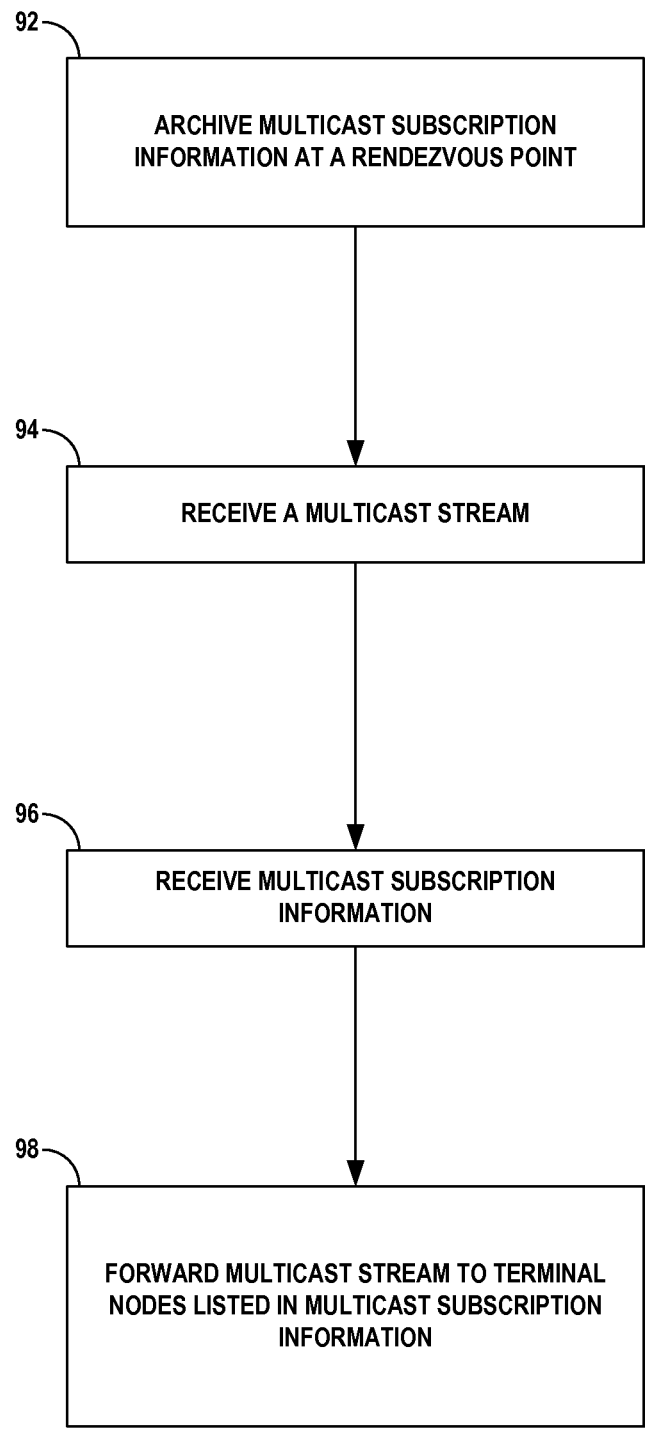
FIG. 14 is a flow diagram illustrating a communication system in an adaptive multicast network according to one example of the disclosure.

FIG. 14 is a flow diagram illustrating a communication system in an adaptive multicast network. In this example, in an adaptive multicast network (e.g., adaptive multicast network 2), multicast subscription information is archived at a rendezvous point (e.g., rendezvous point 14) (92). A router (e.g., router 16A) receives a multicast stream from a sender terminal node (e.g. sender terminal node 4) (94). The router also receives the multicast subscription information from the rendezvous point (96). The router then forwards the multicast stream to any receiver terminal nodes (e.g. receiver terminal node 6A) based on the multicast subscription information (98). In some examples, the adaptive multicast network may be divided into a plurality of trusted networks (e.g. trusted networks 10A, 10B, and 10C), and wherein the rendezvous point is in a first trusted network, and wherein the router and the sender terminal node are in a second trusted network. In some examples, the plurality of trusted networks use heterogeneous routing broadcast protocols and are interconnected with one or more multicast gateways (e.g., multicast gateway 68A), wherein the one or more multicast gateways are configured to implement multiple routing broadcast protocols, interface selection protocols, and gateway coordination protocols. In some examples, these trusted networks are mobile ad hoc networks (MANETs).

Figure 15:
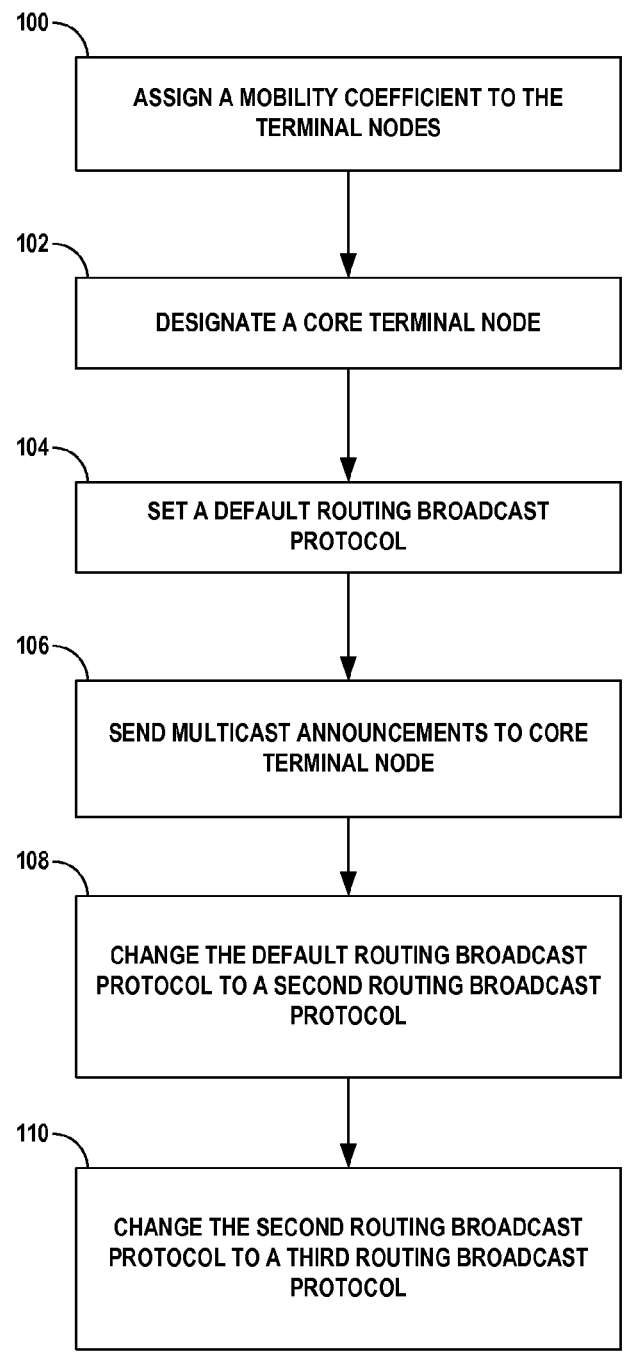
FIG. 15 is a flow diagram illustrating a dynamic routing broadcast protocol according to one example of the disclosure 1.

FIG. 15 is a flow diagram illustrating a dynamic routing broadcast protocol. In this protocol, a mobility coefficient is assigned to each terminal node in a MANET (e.g. MANET 70) (100). Based on this mobility coefficient, a core terminal node is assigned (e.g., core terminal node 80) (102). A default broadcast method is also set (104). A receiver terminal node (e.g., receiver terminal node 76B) sends a multicast announcement to the core terminal node (106). Depending on the mobility coefficients of the receiver terminal nodes and a concentration of the receiver terminal nodes, the default routing broadcast protocol may be changed to a second routing broadcast protocol (108). In some examples, the second routing broadcast may change to a third routing broadcast protocol based on the mobility coefficients of the receiver terminal nodes and the concentration of the receiver terminal nodes (110). In some examples, the default routing broadcast protocol is a tree routing protocol, the second routing broadcast protocol is a mesh routing protocol, and the third routing broadcast protocol is a network flooding protocol.

Figure 16:
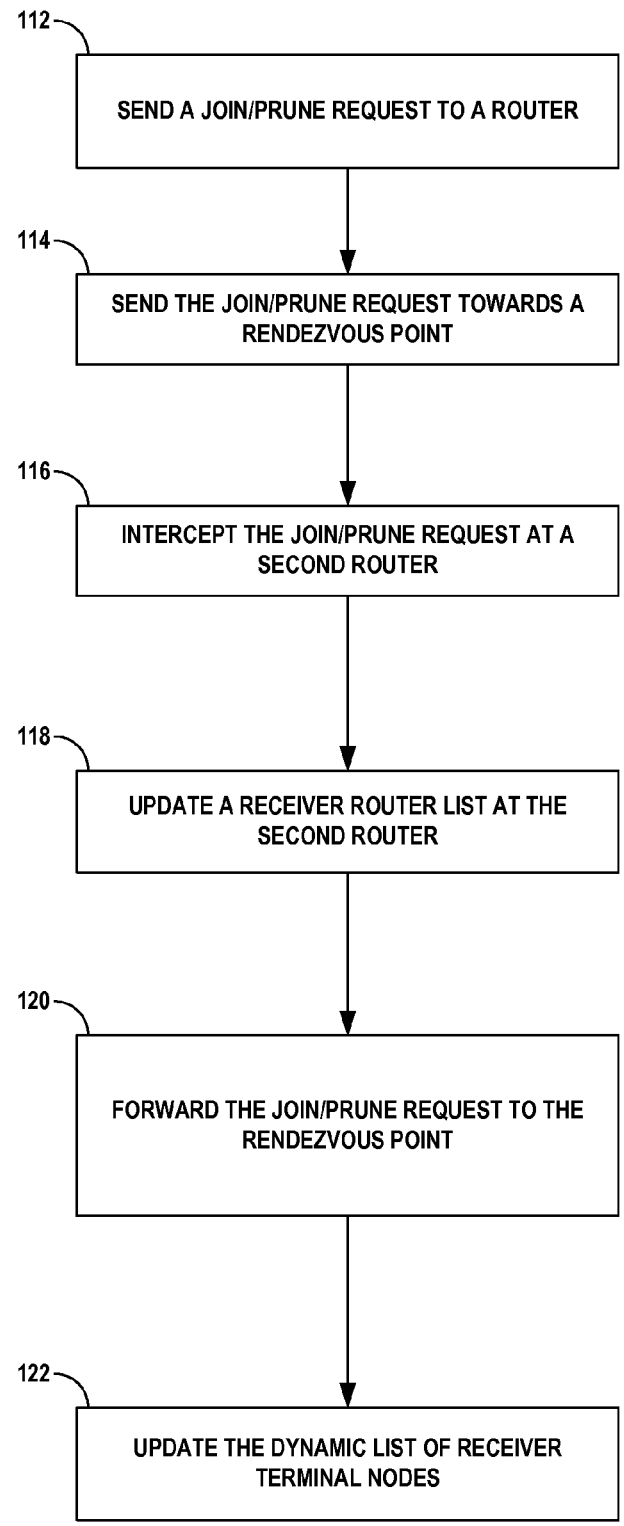
FIG. 16 is a flow diagram illustrating a join and/or prune operation using rendezvous points according to one example of the disclosure.

FIG. 16 is a flow diagram illustrating a join and/or prune operation using rendezvous points. In this example, a terminal node (e.g., terminal node 6A) sends a join or prune request to a router in the same trusted network (e.g., trusted network 10B) as the terminal node (e.g., router 16B) depending on whether the terminal node wants to receive a multicast stream or wants to cease receiving the multicast stream (112). The router sends the join or prune request towards a rendezvous point (e.g., rendezvous point 14), which is located in a second trusted network (e.g., trusted network 10C) (114). This join or prune request is intercepted by a second router in the same trusted network as the rendezvous point (e.g., router 16C) (116). The second router updates a receiver router list based on the join or prune request (118). The second router forwards the join or prune request to the rendezvous point (120). The rendezvous point updates a dynamic list of receiver terminal nodes that it archives (122). In some examples, each trusted network contains an inline network encryptor and a router, wherein each router uses a signaling protocol to communicate with other routers in the adaptive multicast network, wherein the signaling protocol inserts information into pass-through fields of a data packet, wherein the information in the pass-through fields is not encrypted when the data packet passes through the inline network encryptor and can be read at other routers.

Figure 17:
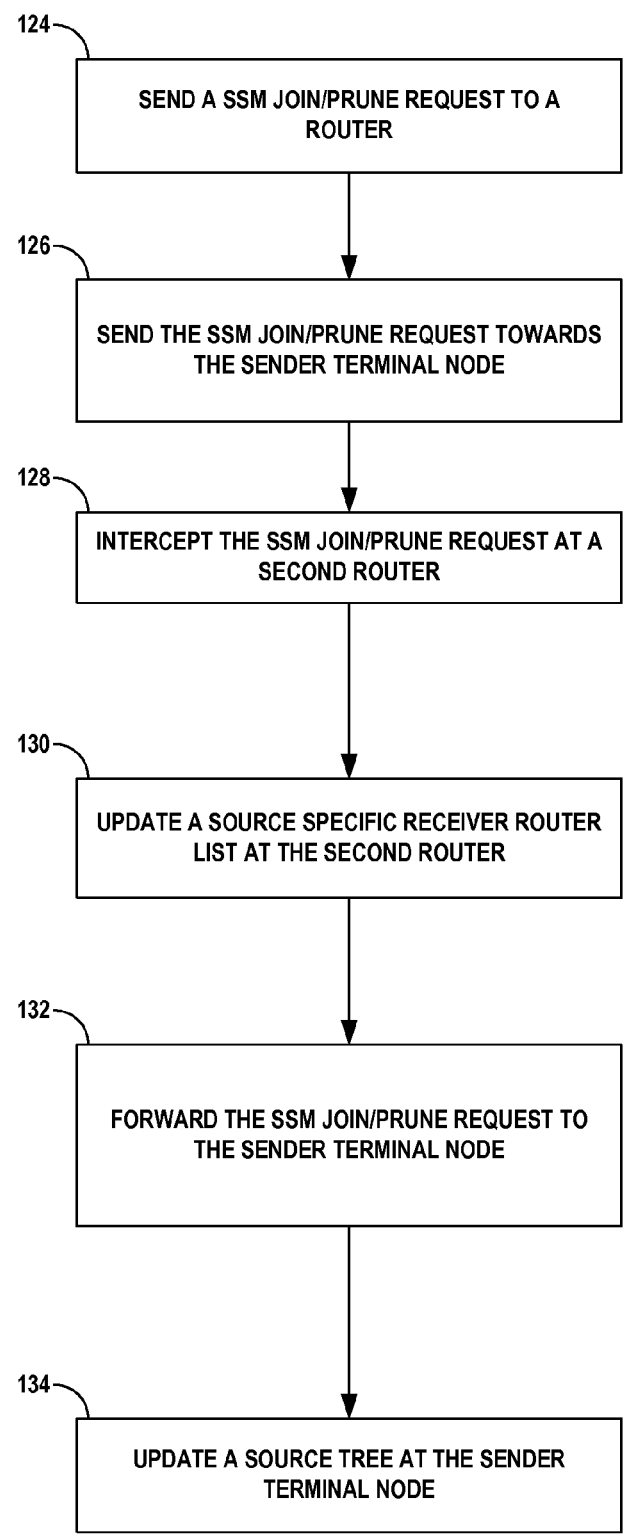
FIG. 17 is a flow diagram illustrating a source-specific multicast join and/or prune operation according to one example of the disclosure.

FIG. 17 is a flow diagram illustrating a source-specific multicast join and/or prune operation. In this example, a terminal node (e.g., terminal node 6A) sends a SSM join or prune request to a router in the same trusted network (e.g., trusted network 10B) as the terminal node (e.g., router 16B) depending on whether the terminal node wants to receive a multicast stream or wants to cease receiving the multicast stream (124). The router sends the SSM join or prune request towards a sender terminal node (e.g., sender terminal node 4), which is located in a second trusted network (e.g., trusted network 10A) (126). This SSM join or prune request is intercepted by a second router in the same trusted network as the sender terminal node (e.g., router 16A) (128). The second router updates a SSM receiver router list based on the SSM join or prune request (130). The second router forwards the SSM join or prune request to the sender terminal node (132). The sender terminal node updates a source tree that it archives (134). In some examples, each trusted network contains an inline network encryptor and a router, wherein each router uses a signaling protocol to communicate with other routers in the adaptive multicast network, wherein the signaling protocol inserts information into pass-through fields of a data packet, wherein the information in the pass-through fields is not encrypted when the data packet passes through the inline network encryptor and can be read at other routers.

Figure 18:
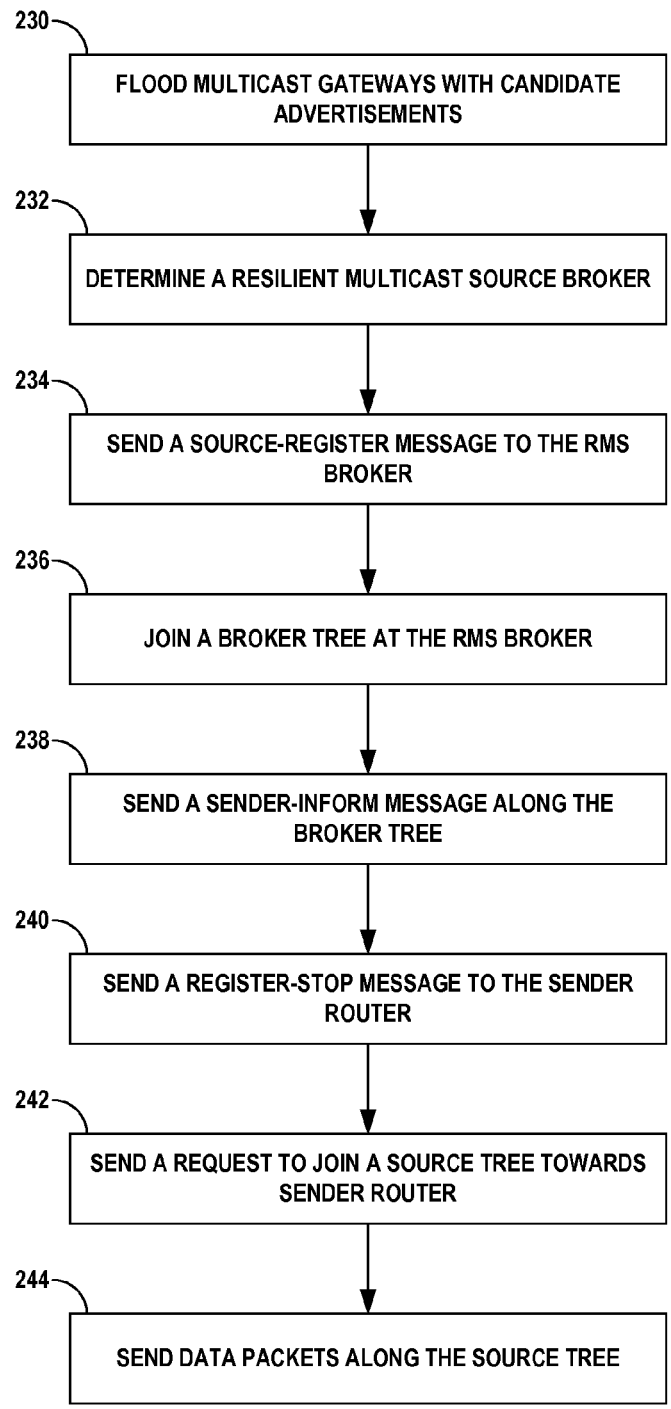
FIG. 18 is a flow diagram illustrating resilient multicast source discovery according to one example of the disclosure.

FIG. 18 is a flow diagram illustrating resilient multicast source discovery according to one example of the disclosure. In this example, one or more routers (e.g., multicast gateways 174, 176A-176B, and 178A-178E) periodically flood the one or more multicast gateways (e.g., multicast gateways 174, 176A-176B, and 178A-178E) with one or more candidate advertisements, wherein each candidate advertisement includes a priority index (230). Each multicast gateway determines a resilient multicast source broker (e.g., broker 174) based on the priority index when a new candidate advertisement is received (232). A sender gateway router (e.g. sender gateway router 176B) periodically sends a source-register message to the resilient multicast source broker (234). A receiver gateway router (e.g., receiver gateway routers 176A-176B, and 178A-178E) joins a broker tree at the resilient multicast source broker (236). The resilient multicast source broker periodically sends a sender-inform message along the broker tree (238). If the broker tree is empty, the resilient multicast source broker sends a register-stop message to the sender gateway router (e.g., sender gateway router 176B) (240). The receiver gateway router sends a request to join a source tree towards the sender router via the one or more multicast gateways (242). The sender router sends data packets along the source tree (244).

Figure 19:
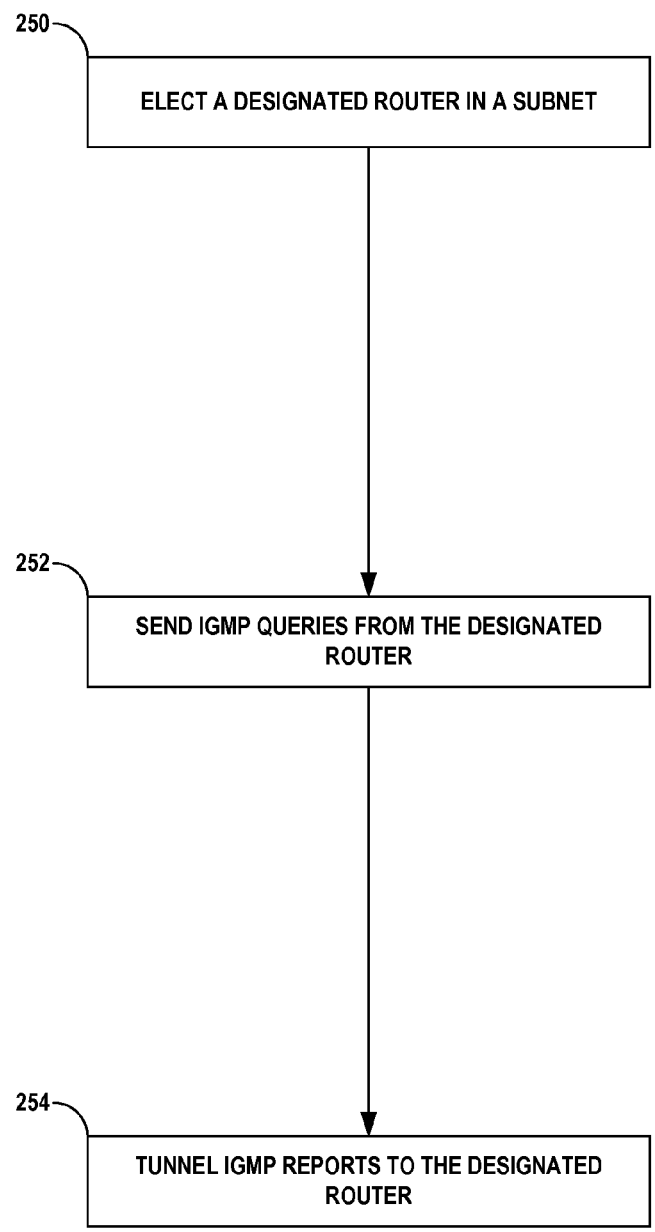
FIG. 19 is a flow diagram illustrating an internet group management protocol tunneling operation, according to one example of the disclosure.

FIG. 19 is a flow diagram illustrating an internet group management protocol tunneling operation, according to one example of the disclosure. In this method, each of a plurality of multicast gateways elects a designated router (e.g., designated router 212) in a subnet (e.g., subnet 210) (250). The designated router sends internet group management protocol queries to at least one router (e.g., routers 214A-214B) in the subnet (252). Internet group management protocol reports are tunneled to the designated router (254). In some examples, the subnet has a preconfigured default gateway, and electing the designated router comprises electing a default gateway router as the designated router. In other examples, each of the plurality of multicast gateways discover one another through a unicast routing protocol, and electing the designated router comprises electing a highest-addressed gateway router as the designated router.

In still other examples, the subnet is a broadcast-capable radio subnet, and sending the internet group management protocol queries comprises sending the internet group management protocol queries via a broadcast. In these examples, first-in-first-out registration messages are broadcast amongst each of the plurality of multicast gateways in the subnet. Each of the plurality of multicast gateways sorts the plurality of multicast gateways according to IP addresses. Each of the plurality of multicast gateways elects a gateway router as the designated router based on the sorted IP addresses.

In still other examples, the subnet is a non-broadcast subnet, and wherein sending the internet group management protocol queries comprises sending the internet group management protocol queries via multicast emulation. In these examples, first-in-first-out registration messages are sent amongst each of the plurality of multicast gateways in the subnet via an emulated all-routers multicast group. Each of the plurality of multicast gateways sorts the plurality of multicast gateways according to IP addresses. Each of the plurality of multicast gateways elects a gateway router as the designated router based on the sorted IP addresses.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples s of the disclosure have been described. These and other examples are within the scope of the following claims.

What is claimed is:

1. A method for communicating in an adaptive multicast network, the method comprising:
  archiving, at a rendezvous point, multicast subscription information for one or more terminal nodes in the adaptive multicast network, wherein the adaptive multicast network is divided into a plurality of trusted networks, wherein the multicast subscription information comprises a dynamic list of receiver terminal nodes located within the adaptive multicast network that subscribe to particular multicast streams from one or more terminal nodes in the adaptive multicast network, and wherein the rendezvous point is a designated router in a first trusted network;
  receiving, at a router, a multicast stream from a sender terminal node, wherein the router and the sender terminal node are in a second trusted network;
  receiving, at the router from the rendezvous point, the multicast subscription information for the multicast stream sent by the sender terminal node; and
  forwarding, from the router, the multicast stream to all receiver terminal nodes in the dynamic list of receiver terminal nodes indicated as subscribing to the multicast stream sent by the sender terminal node.

2. The method of claim 1, further comprising:
  assigning a mobility coefficient to each terminal node in each of the trusted networks;
  designating a core terminal node in each trusted network from the plurality of terminal nodes in each trusted network based on the mobility coefficient;
  setting a default routing broadcast protocol;
  sending multicast announcements from one of the terminal nodes in one of the trusted networks to the core terminal node in that trusted network in the case that the terminal node is requesting to receive a multicast stream; and
  changing the default routing broadcast protocol to a second routing broadcast protocol based on a concentration of terminal nodes that have requested to receive the multicast stream and based on the mobility coefficients assigned to each of the terminal nodes that have requested to receive the multicast stream.

3. The method of claim 2, further comprising changing the second routing broadcast protocol to a third routing broadcast protocol based on the concentration of terminal nodes that have requested to receive the multicast signal and based on the mobility coefficients assigned to each of the terminal nodes that have requested to receive the multicast stream.

4. The method of claim 3, wherein the default routing broadcast protocol is a tree routing protocol, the second routing broadcast protocol is a mesh routing protocol, and the third routing broadcast protocol is a network flooding protocol.

5. The method of claim 1, further comprising:
  using heterogeneous routing broadcast protocols in the plurality of trusted networks; and
  interconnecting the plurality of trusted networks with one or more multicast gateways, wherein the one or more multicast gateways are configured to implement multiple routing broadcast protocols, interface selection protocols, and gateway coordination protocols.

6. The method of claim 5, further comprising:
  periodically flooding, by one or more routers, the one or more multicast gateways with one or more candidate advertisements, wherein each candidate advertisement includes a priority index;
  determining, by each multicast gateway, a resilient multicast source broker based on the priority index when a new candidate advertisement is received;
  periodically sending, by a sender gateway router, a source-register message to the resilient multicast source broker;
  joining, by a receiver gateway router, a broker tree at the resilient multicast source broker;
  periodically sending, by the resilient multicast source broker, a sender-inform message along the broker tree;
  if the broker tree is empty, sending, by the resilient multicast source broker, a register-stop message to the sender gateway router;
  sending, by the receiver gateway router, a request to join a source tree towards the sender router via the one or more multicast gateways; and
  sending, by the sender router, data packets along the source tree.

7. The method of claim 6, further comprising:
  responsive to receiving a multicast data packet from a sender terminal node, obtaining, by the sender gateway router, a mapping between a regular IP address of the sender router and a mobile IP address of the sender router;
  sending, by one of the multicast gateways, a source-register message to the resilient multicast source broker, wherein the source-register message includes the mapping;
  sending, by the resilient multicast source broker router, a sender-inform message to the receiver gateway router, wherein the sender-inform message includes the mapping; and converting, by the receiver gateway router, a regular IP address of a data packet to a mobile IP address using the mapping.

8. The method of claim 7, further comprising:
sending, by the receiver router, a source-specific report to a subnet, wherein a source in the source-specific report is the mobile IP address of the sender router;
responsive to verifying that the source is a mobile IP address, converting, by the receiver gateway router, the mobile IP address in the source-specific report to a regular IP address; and
replacing, by the receiver gateway router, the mobile IP address in the source-specific report with the regular IP address.

9. The method of claim 1, further comprising updating the dynamic list of receiver terminal nodes, wherein updating the dynamic list of receiver terminal nodes comprises:
sending a join request from one of the plurality of terminal nodes in a first trusted network to a router in the first trusted network when the terminal node is requesting to receive a multicast stream;
sending a prune request from one of the plurality of terminal nodes in a first trusted network to a router in the first trusted network when the terminal node is requesting to cease to receive a multicast stream;
sending the join or prune request from the router in the first trusted network towards the rendezvous point;
intercepting, at a router in a second trusted network, wherein the second trusted network is in the same trusted network as the rendezvous point, the join or prune request;
updating a receiver router list at the router in the second trusted network based on the instructions in the join or prune request;
forwarding the join or prune request from the router in the second trusted network to the rendezvous point; and
updating the dynamic list of receiver terminal nodes at the rendezvous point.

10. The method of claim 9, wherein each trusted network contains an inline network encryptor and a router, wherein each router uses a signaling protocol to communicate with other routers in the adaptive multicast network, wherein the signaling protocol inserts information into pass-through fields of a data packet, wherein the information in the pass-through fields is not encrypted when the data packet passes through the inline network encryptor and can be read at other routers.

11. The method of claim 1, wherein each trusted network is a mobile ad hoc network (MANET).

12. The method of claim 1, further comprising performing source-specific multicast registration, wherein performing source-specific multicast registration comprises:
sending a source-specific multicast join request from one of the plurality of terminal nodes in a first trusted network to a router in the same trusted network when the terminal node wants to receive a multicast stream;
sending a source-specific multicast prune request from one of the plurality of terminal nodes in the first trusted network to the router in the same trusted network when the terminal node wants to cease receiving a multicast stream;
sending the source-specific multicast join or prune request from the router in the first trusted network towards the sender terminal node, wherein the sender terminal node is in a second trusted network;
intercepting, at a router in the same trusted network as the sender terminal node, the source-specific multicast join or prune request sent to the sender terminal node;
updating a source-specific receiver router list at the router in the second trusted network based on the instructions in the source-specific multicast join or prune request;
forwarding the source-specific multicast join or prune request to the sender terminal node; and
updating a source tree at the sender terminal node based on the instructions in the source-specific multicast join or prune request.

13. The method of claim 1, wherein each trusted network contains an inline network encryptor and a router, wherein each router uses a signaling protocol to communicate with other routers in the adaptive multicast network, wherein the signaling protocol inserts information into pass-through fields of a data packet, wherein the information in the pass-through fields is not encrypted when the data packet passes through the inline network encryptor and can be read at other routers.

14. The method of claim 1, wherein the router is a first router, the method further comprising:
attaching, by one or more sender routers in an untrusted network, a community of interest name to the first router's respective enclave;
responsive to receiving sender information, checking, by a receiver router, the community of interest name for each sender router of a multicast group;
determining, by the receiver router, whether the enclave containing the sender router has the same community of interest name as the enclave containing the receiver router;
responsive to determining that the enclave containing the sender router has the same community of interest name as the enclave containing the receiver router, subscribing, by the receiver router, to a multicast stream.

15. The method of claim 14, wherein the sender routers are configured with a community of interest name through a configuration file.

16. A communication system in an adaptive multicast network, the communication system comprising:
one or more terminal nodes;
a rendezvous point, wherein the rendezvous point is a designated router in a trusted network that stores multicast subscription information for the adaptive multicast network is configured to archive the multicast subscription information for the one or more terminal nodes, wherein the multicast subscription information comprises a dynamic list of receiver terminal nodes located within the adaptive multicast network that subscribe to particular multicast streams from one or more terminal nodes in the adaptive multicast network;
a router, wherein the router is configured to receive a multicast stream from a sender terminal node and to receive the multicast subscription information for the multicast stream sent by the sender terminal node from the rendezvous point, and wherein the router is further configured to forward the multicast stream to all receiver terminal nodes in the dynamic list of receiver terminal nodes indicated as subscribing to the multicast stream sent by the sender terminal node.

17. The communication system of claim 16, wherein the adaptive multicast network is divided into a plurality of trusted networks, and wherein the rendezvous point is in a first trusted network, and wherein the router and the sender terminal node are in a second trusted network.

18. The communication system of claim 17, wherein each terminal node in each of the trusted networks is assigned a mobility coefficient, further comprising:
- a core terminal node, wherein the core terminal node is designated in each trusted network from the plurality of terminal nodes in each trusted network based on the mobility coefficient, and wherein one of the terminal nodes in one trusted network sends a multicast announcement to the core terminal node in that network in the case that the terminal node is requesting to receive a multicast stream; and
- a default routing broadcast protocol, wherein the default routing broadcast protocol is changed to a second routing broadcast protocol based on a concentration of terminal nodes that have requested to receive the multicast stream and based on the mobility coefficients assigned to each of the terminal nodes that have requested to receive the multicast stream, and wherein the second routing broadcast protocol is changed to a third routing broadcast protocol based on the concentration of terminal nodes that have requested to receive the multicast signal and based on the mobility coefficients assigned to each of the terminal nodes that have requested to receive the multicast stream.

19. The communication system of claim 18, wherein the default routing broadcast protocol is a tree routing protocol, the second routing broadcast protocol is a mesh routing protocol, and the third routing broadcast protocol is a network flooding protocol.

20. The communication system of claim 17, wherein the plurality of trusted networks use heterogeneous routing broadcast protocols, further comprising one or more multicast gateways, wherein the one or more multicast gateways interconnect the plurality of trusted networks and are configured to implement multiple routing broadcast protocols, interface selection protocols, and gateway coordination protocols.

21. The method of claim 17, wherein each trusted network is a mobile ad hoc network (MANET).

22. A non-transitory computer-readable storage medium storing instructions that, when executed, cause one or more processors of a system configured to communicate between terminal nodes in a mobile ad hoc network to:
- assign a mobility coefficient to each terminal node in the mobile ad hoc network;
- designate a core terminal node in the mobile ad hoc network from the plurality of terminal nodes based on the mobility coefficient;
- set a default routing broadcast protocol;
- send multicast announcements from one of the terminal nodes in the mobile ad hoc network to the core terminal node in the mobile ad hoc network in the case that the terminal node is requesting to receive a multicast stream; and
- change the default routing broadcast protocol to a second routing broadcast protocol based on a concentration of terminal nodes that have requested to receive the multicast stream and based on the mobility coefficients assigned to each of the terminal nodes that have requested to receive the multicast stream.

23. The non-transitory computer-readable storage medium of claim 22, wherein the instructions further cause one or more processors of the system to change the second routing broadcast protocol to a third routing broadcast protocol based on a concentration of terminal nodes that have requested to receive the multicast signal and based on the mobility coefficients assigned to each of the terminal nodes that have requested to receive the multicast stream.

24. The non-transitory computer-readable storage medium of claim 23, wherein the default routing broadcast protocol is a tree routing protocol, the second routing broadcast protocol is a mesh routing protocol, and the third routing broadcast protocol is a network flooding protocol.

* * * * *